US012393204B2

(12) United States Patent
Lisin et al.

(10) Patent No.: US 12,393,204 B2
(45) Date of Patent: Aug. 19, 2025

(54) MAPPING STASIS FOR MOBILE CLEANING ROBOT

(71) Applicant: iRobot Corporation, Bedford, MA (US)

(72) Inventors: Dimitri A. Lisin, Shrewsbury, MA (US); Yao Chen, Melrose, MA (US); Adel Fakih, Waterloo (CA)

(73) Assignee: iRobot Corporation, Bedford, MA (US)

( * ) Notice: Subject to any disclaimer, the term of this patent is extended or adjusted under 35 U.S.C. 154(b) by 227 days.

(21) Appl. No.: 18/211,047

(22) Filed: Jun. 16, 2023

(65) Prior Publication Data

US 2024/0419173 A1    Dec. 19, 2024

(51) Int. Cl.
*G05D 1/246* (2024.01)
*A47L 11/40* (2006.01)
(Continued)

(52) U.S. Cl.
CPC .......... *G05D 1/246* (2024.01); *A47L 11/4011* (2013.01); *G05D 1/2437* (2024.01);
(Continued)

(58) Field of Classification Search
CPC .. G05D 1/0274; G05D 1/0246; G05D 1/0272; G05D 1/2437; G05D 1/246;
(Continued)

(56) References Cited

U.S. PATENT DOCUMENTS

2009/0055020 A1    2/2009  Jeong et al.
2013/0310978 A1*  11/2013  Ozick .................. G05D 1/0227
                                                    700/258
(Continued)

FOREIGN PATENT DOCUMENTS

CN        107411639          12/2017
WO    WO-2021141396 A1 *     7/2021    .......... A47L 11/4061
WO        2024258927         12/2024

OTHER PUBLICATIONS

Cadena et al.; Past, Present, and Future of Simultaneous Localization and Mapping: Toward the Robust-Perception Age; IEEE Transactions on Robotics, vol. 32, No. 6, Dec. 2016; pp. 1309-1332 (Year: 2016).*

(Continued)

*Primary Examiner* — Michael J Zanelli
(74) *Attorney, Agent, or Firm* — Schwegman Lundberg & Woessner, P.A.

(57) ABSTRACT

A mobile cleaning robot configured to clean an environment. The mobile cleaning robot can include a body and a drivetrain operable to move the body within the environment. The robot can include a sensor connected to the body and configured to generate a sensor signal based on interactions between the mobile cleaning robot and the environment. The robot can include an image capture device connected to the body and configured to generate an image stream based on an optical field of view of the image capture device. The robot can include a controller connected to the body and configured to determine whether the mobile cleaning robot is in a stasis condition based on the image stream and the sensor signal. The controller can also update a map of the environment based on the stasis determination.

22 Claims, 13 Drawing Sheets

(51) Int. Cl.
  *G05D 1/243*   (2024.01)
  *G05D 1/648*   (2024.01)
  *G05D 105/10*  (2024.01)
  *G05D 107/40*  (2024.01)

(52) U.S. Cl.
  CPC .......... *G05D 1/648* (2024.01); *A47L 2201/04* (2013.01); *G05D 2105/10* (2024.01); *G05D 2107/40* (2024.01)

(58) Field of Classification Search
  CPC ........ G05D 1/648; G05D 1/243; G05D 1/245; G05D 1/628; G05D 1/639; G05D 1/2464; G05D 2105/10; G05D 2107/40; G05D 2111/10; G05D 2111/54; G05D 2109/10; G06V 20/58
  See application file for complete search history.

(56) References Cited

U.S. PATENT DOCUMENTS

| | | |
|---|---|---|
| 2019/0212752 A1 | 7/2019 | Fong et al. |
| 2022/0047134 A1 | 2/2022 | Burbank et al. |
| 2022/0083074 A1 | 3/2022 | Ferrer et al. |

OTHER PUBLICATIONS

"International Application Serial No. PCT US2024 033549, Invitation to Pay Additional Fees mailed Aug. 19, 2024", 10 pgs.
"International Application Serial No. PCT US2024 033549, International Search Report mailed Oct. 10, 2024", 6 pgs.
"International Application Serial No. PCT US2024 033549, Written Opinion mailed Oct. 10, 2024", 10 pgs.

\* cited by examiner

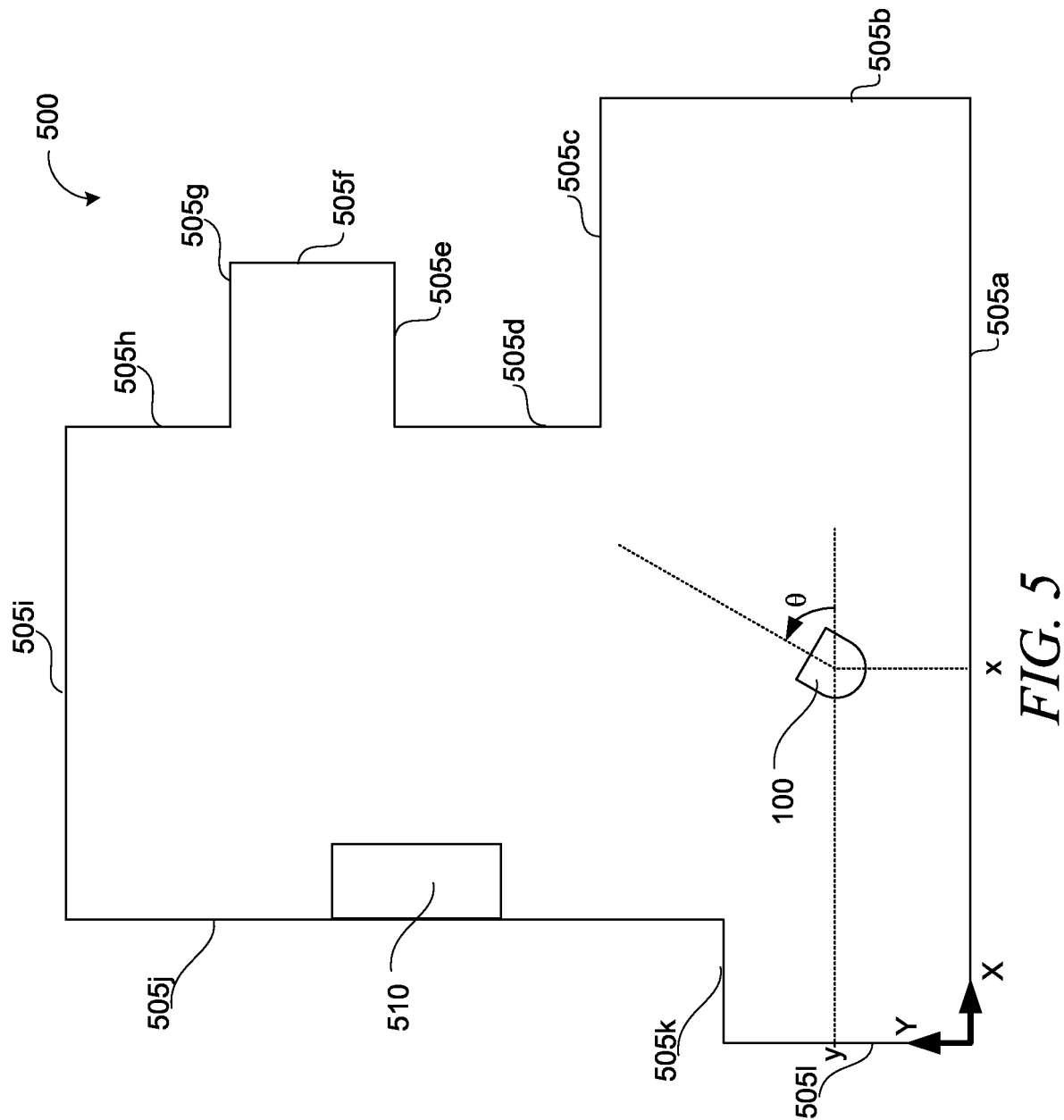

| I_1 vs I_2 | I_2 vs I_3 | I_3 vs I_4 | ... |
|---|---|---|---|
| I_1 vs I_3 | I_2 vs I_4 | I_3 vs I_5 | ... |
| I_1 vs I_4 | I_2 vs I_5 | I_3 vs I_6 | ... |
| ... | ... | ... | ... |

FIG. 10

MAPPING STASIS FOR MOBILE CLEANING ROBOT

BACKGROUND

Autonomous mobile cleaning robots can traverse floor surfaces to perform various operations in an environment, such as vacuuming of one or more rooms of the environment. A cleaning robot can include a controller configured to autonomously navigate the robot about an environment such that the robot can ingest debris as it moves. As an autonomous mobile robot traverses a floor surface, the robot can produce and record information about the environment and the robot, such as to generate a map of the environment for use in cleaning operations.

SUMMARY

Mobile cleaning robots can be used by users, such as homeowners, to perform ad hoc or scheduled cleaning missions. During missions, robots can autonomously navigate the environment and perform cleaning operations, such as vacuuming or mopping (or both). During navigation and cleaning, a robot can use its camera to detect objects within the environment, such as for odometry, avoidance, or scene understanding. This detection can help the robot to perform better cleaning operations, make and use a map of the environment, and avoid ingestion of non-debris items. Other sensors of the robot, including wheel encoders, optical sensors, or positioning sensors can also be used to develop and update the map. However, as the robot moves throughout the map it can become stuck. In some instances of being stuck or trapped, its wheels can still move leading the robot to incorrectly assume it is moving. During this period of stasis with moving wheels, the robot can record mapping data, such as locations, direction of travel, and distance traveled, which can be recorded on the map incorrectly due to the lack of actual movement of the robot.

This disclosure describes examples of devices, systems, and methods that can help to address this problem such as by using additional data collected by the robot to determine when the robot has entered stasis, such as by using one or more images (e.g., an image stream) of a camera of the robot. The images can be compared to make the stasis determination (such as using gradient comparison). When stasis is determined to be present, the map can be updated to remove some or all of the incorrectly mapped data, helping to increase the accuracy of the map over time.

For example, a mobile cleaning robot configured to clean an environment. The mobile cleaning robot can include a body and a drivetrain operable to move the body within the environment. The robot can include a sensor connected to the body and configured to generate a sensor signal based on interactions between the mobile cleaning robot and the environment. The robot can include an image capture device connected to the body and configured to generate an image stream based on an optical field of view of the image capture device. The robot can include a controller connected to the body and configured to determine whether the mobile cleaning robot is in a stasis condition based on the image stream and the sensor signal. The controller can also update a map of the environment based on the stasis determination.

The above discussion is intended to provide an overview of subject matter of the present patent application. It is not intended to provide an exclusive or exhaustive explanation of the invention. The description below is included to provide further information about the present patent application.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 5 illustrates a plan view of a map of an environment.

FIG. 10 illustrates an example of a score array.

DETAILED DESCRIPTION

Figure 1:
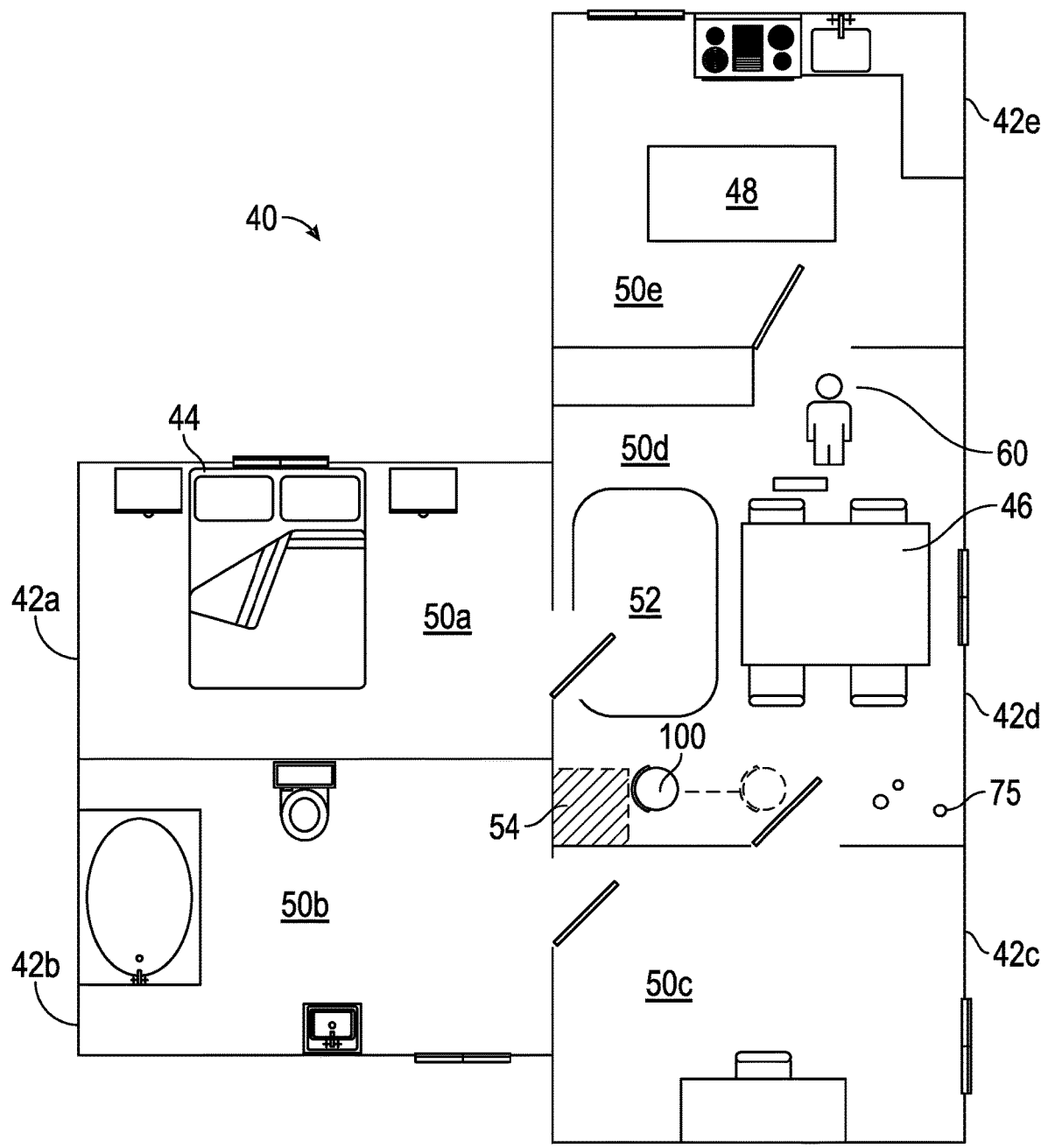
FIG. 1 illustrates a plan view of a mobile cleaning robot in an environment.

FIG. 1 illustrates a plan view of a mobile cleaning robot 100 in an environment 40, in accordance with at least one example of this disclosure. The environment 40 can be a dwelling, such as a home or an apartment, and can include rooms 42a-42e. Obstacles, such as a bed 44, a table 46, and an island 48 can be located in one or more of the rooms 42 of the environment. Each of the rooms 42a-42e can have a floor surface 50a-50e, respectively. Some rooms, such as the room 42d, can include a rug, such as a rug 52. The floor surfaces 50 can be of one or more types of flooring, such as hardwood, ceramic, low-pile carpet, medium-pile carpet, long (or high)-pile carpet, stone, or the like.

The mobile cleaning robot 100 can be operated, such as by a user 60, to autonomously clean the environment 40 in a room-by-room fashion. In some examples, the robot 100 can clean the floor surface 50a of one room, such as the room 42a, before moving to the next room, such as the room 42d, to clean the surface of the room 42d. Different rooms can have different types of floor surfaces. For example, the room 42e (which can be a kitchen) can have a hard floor surface, such as wood or ceramic tile, and the room 42a (which can be a bedroom) can have a carpet surface, such as a medium pile carpet. Other rooms, such as the room 42d

(which can be a dining room) can include multiple surfaces where the rug 52 is located within the room 42d.

During cleaning or traveling operations, the robot 100 can use data collected from various sensors and calculations (such as odometry and obstacle detection) to develop a map of the environment 40. Once the map is created, the user 60 can define rooms or zones (such as the rooms 42) within the map. The map can be presentable to the user 60 on a user interface, such as a mobile device, where the user 60 can direct or change cleaning preferences.

During operation, the robot 100 can detect surface types within each of the rooms 42, which can be stored in the robot or another device. The robot 100 can update the map (or data related thereto) such as to include or account for surface types of the floor surfaces 50a-50e of each of the respective rooms 42 of the environment. In some examples, the map can be updated to show the different surface types such as within each of the rooms 42.

In some examples, the user 60 can define a behavior control zone 54 using, for example, the methods and systems described herein. In response to the user 60 defining the behavior control zone 54, the robot 100 can move toward the behavior control zone 54 to confirm the selection. After confirmation, autonomous operation of the robot 100 can be initiated. In autonomous operation, the robot 100 can initiate a behavior in response to being in or near the behavior control zone 54. For example, the user 60 can define an area of the environment 40 that is prone to becoming dirty to be the behavior control zone 54. In response, the robot 100 can initiate a focused cleaning behavior in which the robot 100 performs a focused cleaning of a portion of the floor surface 50d in the behavior control zone 54.

Components of the Robot

Figure 2A:
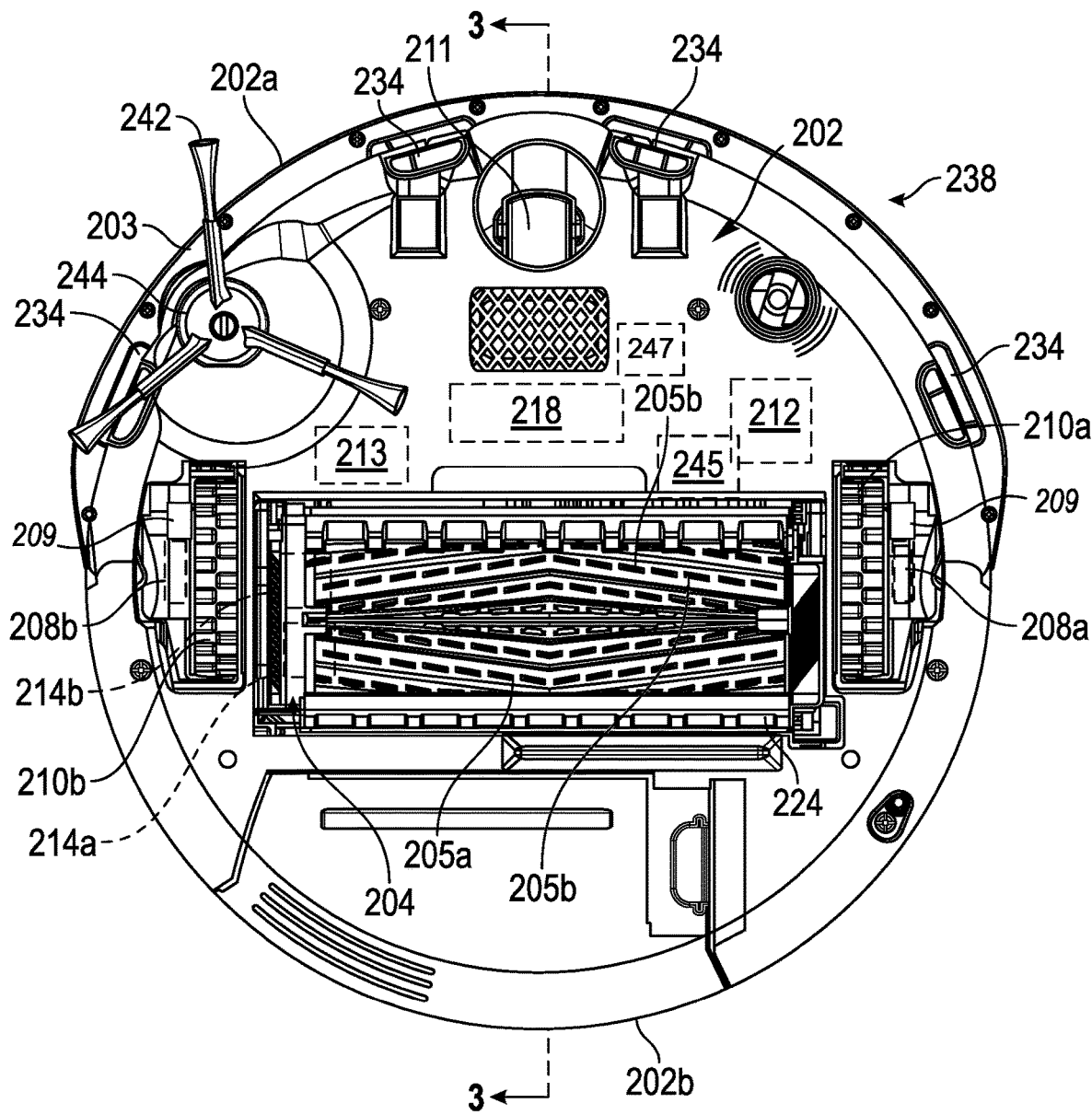
FIG. 2A illustrates a bottom view of a mobile cleaning robot.
Figure 2B:
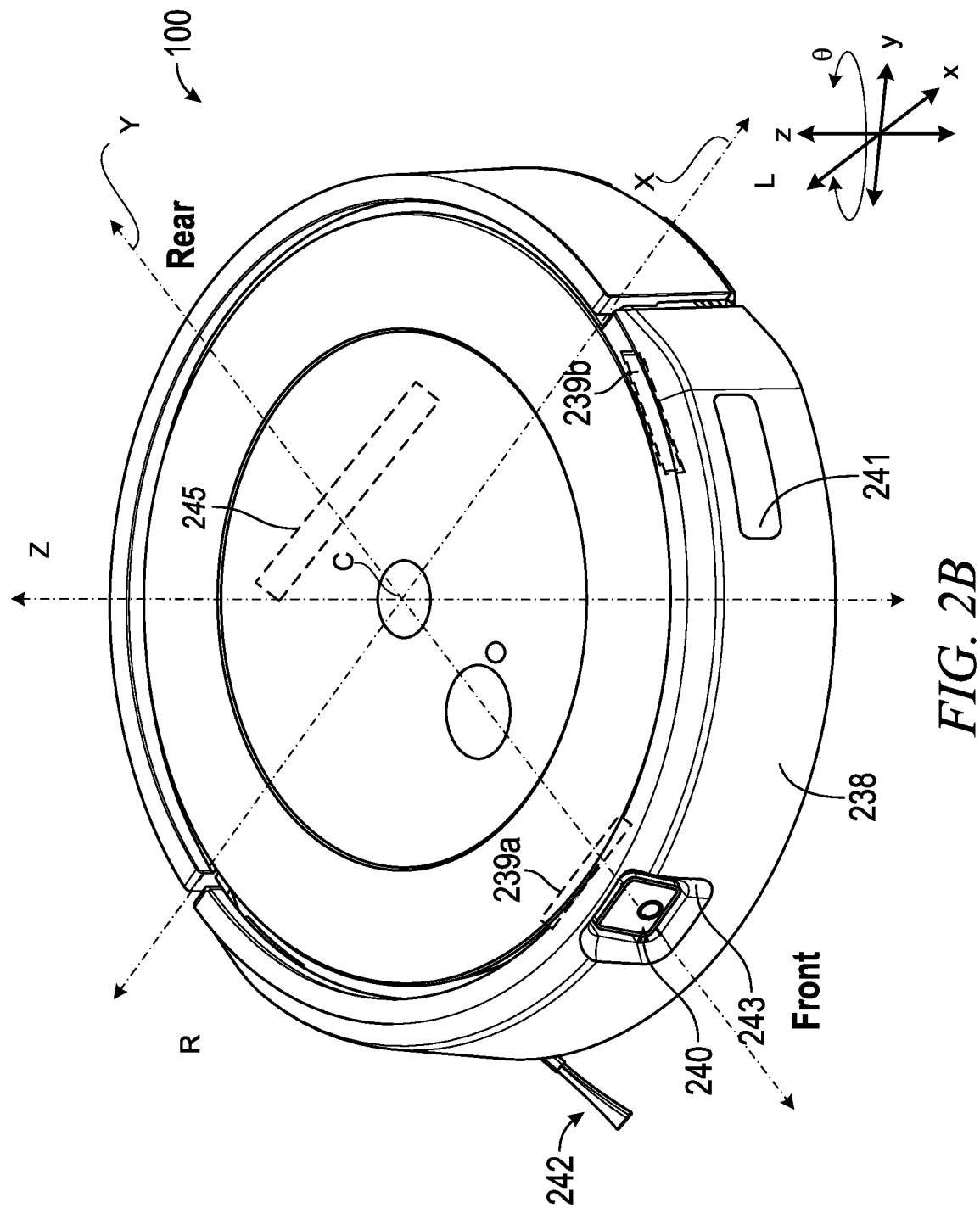
FIG. 2B illustrates an isometric view of a mobile cleaning robot.
Figure 3:
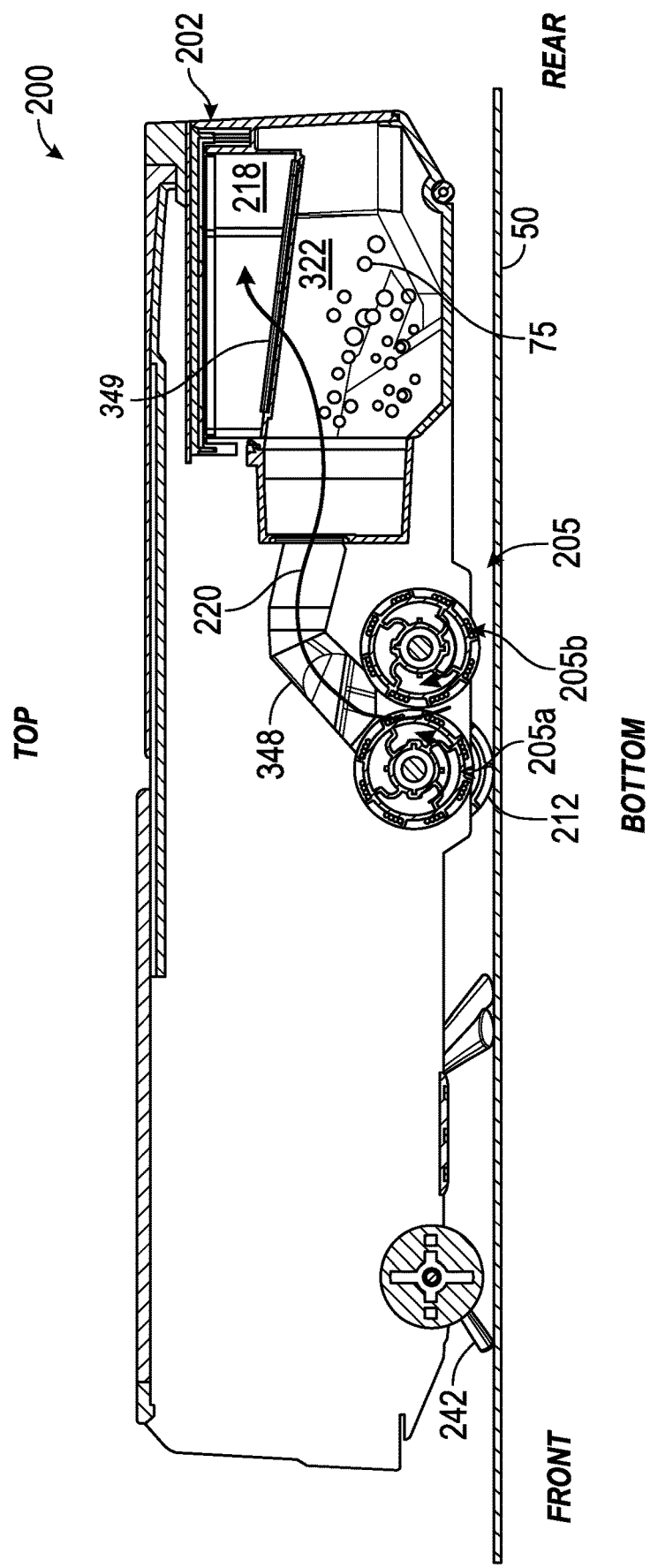
FIG. 3 illustrates a cross-section view across indicators 3-3 of FIG. 2A of a mobile cleaning robot.

FIG. 2A illustrates a bottom view of the mobile cleaning robot 100. FIG. 2B illustrates a top view of the mobile cleaning robot 100. FIG. 3 illustrates a cross-section view across indicators 3-3 of FIG. 2A of the mobile cleaning robot 100. FIG. 3 also shows orientation indicators Front and Rear. FIGS. 2A-3 are discussed together below.

The cleaning robot 100 can be an autonomous cleaning robot that can autonomously traverse the floor surface 50 while ingesting the debris 75 from different parts of the floor surface 50. As shown in FIGS. 2A and 3, the robot 100 can include a body 202 movable across the floor surface 50. The body 202 can include multiple connected structures to which components of the cleaning robot 100 are mounted. The connected structures can include, for example, an outer housing to cover internal components of the cleaning robot 100, a chassis or frame to which the drive wheels 210a and 210b and the cleaning rollers 205a and 205b (of a cleaning assembly 204) are mounted, and a bumper 238. The bumper 238 can be removably secured to the body 202 and can be movable relative to the body 202 while mounted thereto. In some examples, the bumper 238 can form part of the body 202.

As shown in FIG. 2A, the body 202 includes a front portion 202a that has a substantially semicircular shape and a rear portion 202b that has a substantially semicircular shape. These portions can have other shapes in other examples, such as a square front (or rounded square front). As shown in FIG. 2A, the robot 100 can include a drive system including actuators 208a and 208b, which can be, for example, motors. The actuators 208a and 208b can be mounted in the body 202 and can be operably connected to the drive wheels 210a and 210b, which can be rotatably mounted to the body 202 to support the body 202 above the floor surface 50. The actuators 208a and 208b, when driven, can rotate the drive wheels 210a and 210b to enable the robot 100 to autonomously move across the floor surface 50. The robot 100 can also include encoders 209 that can be connected to the motors 208 and configured to generate a signal based on operation of the motors 208, which can be used, e.g., by the controller 212 to determine a speed, direction of travel, or the like, of the robot 100.

The controller (or processor) 212 can be located within the housing and can be a programmable controller, such as a single or multi-board computer, a direct digital controller (DDC), a programmable logic controller (PLC), or the like. In other examples the controller 212 can be any computing device, such as a handheld computer, for example, a smart phone, a tablet, a laptop, a desktop computer, or any other computing device including a processor, memory, and communication capabilities. The memory 213 can be one or more types of memory, such as volatile or non-volatile memory, read-only memory (ROM), random-access memory (RAM), magnetic disk storage media, optical storage media, flash-memory devices, and other storage devices and media. The memory 213 can be located within the body 202, connected to the controller 212 and accessible by the controller 212.

The controller 212 can operate the actuators 208a and 208b to autonomously navigate the robot 100 about the floor surface 50 during a cleaning operation. The actuators 208a and 208b can be operable to drive the robot 100 in a forward drive direction, in a backwards direction, or to turn the robot 100. The robot 100 can include a caster wheel 211 that can support the body 202 above the floor surface 50. The caster wheel 211 can support the front portion 202a of the body 202 above the floor surface 50, and the drive wheels 210a and 210b can support the rear portion 202b of the body 202 above the floor surface 50.

As shown in FIG. 3, a vacuum assembly 218 can be located at least partially within the body 202 of the robot 100, e.g., in the rear portion 202b of the body 202. The controller 212 can operate the vacuum assembly 218 to generate an airflow that flows through the air gap near the cleaning rollers 205, through the body 202, and out of the body 202. The vacuum assembly 218 can include, for example, an impeller that generates the airflow when rotated. The airflow and the cleaning rollers 205, when rotated, can cooperate to ingest debris 75 into a suction duct 348 of the robot 100. The suction duct 348 can extend down to or near a bottom portion of the body 202 and can be at least partially defined by the cleaning assembly 204.

The suction duct 348 can be connected to the cleaning head 204 or cleaning assembly and can be connected to a cleaning bin 322. The cleaning bin 322 can be mounted in the body 202 and can contain the debris 75 ingested by the robot 100. A filter 349 can be located in the body 202, which can help to separate the debris 75 from the airflow before the airflow 220 enters the vacuum assembly 218 and is exhausted out of the body 202. In this regard, the debris 75 can be captured in both the cleaning bin 322 and the filter before the airflow 220 is exhausted from the body 202.

The cleaning rollers 205a and 205b can be operably connected to one or more actuators 214a and 214b, e.g., motors, respectively. The cleaning head 204 and the cleaning rollers 205a and 205b can be positioned forward of the cleaning bin 322. The cleaning rollers 205a and 205b can be mounted to a housing 224 of the cleaning head 204 and mounted, e.g., indirectly or directly, to the body 202 of the robot 100. In particular, the cleaning rollers 205a and 205b can be mounted to an underside of the body 202 so that the cleaning rollers 205a and 205b engage debris 75 on the floor surface 50 during the cleaning operation when the underside faces the floor surface 50.

The housing 224 of the cleaning head 204 can be mounted to the body 202 of the robot 100. In this regard, the cleaning rollers 205a and 205b can also be mounted to the body 202 of the robot 100, such as indirectly mounted to the body 202 through the housing 224. Alternatively, or additionally, the cleaning head 204 can be a removable assembly of the robot 100 where the housing 224 (with the cleaning rollers 205a and 205b mounted therein) is removably mounted to the body 202 of the robot 100.

A side brush 242 can be connected to an underside of the robot 100 and can be connected to a motor 244 operable to rotate the side brush 242 with respect to the body 202 of the robot 100. The side brush 242 can be configured to engage debris to move the debris toward the cleaning assembly 205 or away from edges of the environment 40. The motor 244 configured to drive the side brush 242 can be in communication with the controller 212. The brush 242 can be a side brush laterally offset from a center of the robot 100 such that the brush 242 can extend beyond an outer perimeter of the body 202 of the robot 100. Similarly, the brush 242 can also be forwardly offset of a center of the robot 100 such that the brush 242 also extends beyond the bumper 238 or an outer periphery of the body 202.

The robot 100 can further include a sensor system with one or more electrical sensors. The sensor system can generate one or more signals indicative of a current location of the robot 100, and can generate one or more signals indicative of locations of the robot 100 as the robot 100 travels along the floor surface 50.

For example, cliff sensors 234 (shown in FIG. 2A) can be located along a bottom portion of the body 202. The cliff sensors 234 can include an optical sensor that can be configured to detect a presence or absence of an object below the optical sensor, such as the floor surface 50. The cliff sensors 234 can be connected to the controller 212.

The bump sensors 239a and 239b (the bump sensors 239) can be connected to the body 202 and can be engageable or configured to interact with the bumper 238. The bump sensors 239 can include break beam sensors, Hall Effect sensors, capacitive sensors, switches, or other sensors that can detect contact between the robot 100 (e.g., the bumper 238) and objects in the environment 40. The bump sensors 239 can be in communication with the controller 212.

An image capture device 240 can be connected to the body 202 and can extend at least partially through the bumper 238 of the robot 100, such as through an opening 243 of the bumper 238. The image capture device 240 can be a camera, such as a front-facing camera, configured to generate a signal based on imagery of the environment 40 of the robot 100. The image capture device 240 can transmit the image capture signal to the controller 212 for use for navigation and cleaning routines.

Obstacle follow sensors 241 (shown in FIG. 2B) can include an optical sensor facing outward or downward from the bumper 238 that can be configured to detect the presence or the absence of an object adjacent to a side of the body 202. The obstacle follow sensor 241 can emit an optical beam horizontally in a direction perpendicular (or nearly perpendicular) to the forward drive direction of the robot 100. The optical emitter can emit an optical beam outward from the robot 100, e.g., outward in a horizontal direction, and the optical detector detects a reflection of the optical beam that reflects off an object near the robot 100. The robot 100, e.g., using the controller 212, can determine a time of flight of the optical beam and thereby determine a distance between the optical detector and the object, and hence a distance between the robot 100 and the object.

The robot 100 can also optionally include one or more dirt sensors 245 connected to the body 202 and in communication with the controller 212. The dirt sensors 245 can be a microphone, piezoelectric sensor, optical sensor, or the like, and can be located in or near a flow path of debris, such as near an opening of the cleaning rollers 205 or in one or more ducts within the body 202. This can allow the dirt sensor(s) 245 to detect how much dirt is being ingested by the vacuum assembly 218 (e.g., via the extractor 204) at any time during a cleaning mission. Because the robot 100 can be aware of its location, the robot 100 can keep a log or record of which areas or rooms of the map are dirtier or where more dirt is collected. The robot 100 can also include a battery 247 operable to power one or more components (such as the motors) of the robot.

Operation of the Robot

In operation of some examples, the robot 100 can be propelled in a forward drive direction or a rearward drive direction. The robot 100 can also be propelled such that the robot 100 turns in place or turns while moving in the forward drive direction or the rearward drive direction. The robot 100 can move across a floor surface of a physical environment through various combinations of movements relative to three perpendicular axes defined by the body 102: a transverse axis X, a fore-aft axis Y, and a central vertical axis Z. A forward drive direction along the fore-aft axis Y is designated Front, and an aft drive direction along the fore-aft axis Y is designated as Rear. The transverse axis X extends between a right side R and a left side L.

When the controller 212 causes the robot 100 to perform a mission, the controller 212 can operate the motors 208 to drive the drive wheels 210 and propel the robot 100 along the floor surface 50. In addition, the controller 212 can operate the motors 214 to cause the rollers 205a and 205b to rotate, can operate the motor 244 to cause the brush 242 to rotate, or can operate the motor of the vacuum system 218 to generate airflow. The controller 212 can also execute software stored on the memory 213 to cause the robot 100 to perform various navigational and cleaning behaviors by operating the various motors or components of the robot 100.

The various sensors of the robot 100 can be used to help the robot navigate and clean within the environment 40. For example, the cliff sensors 234 can detect obstacles such as drop-offs and cliffs below portions of the robot 100 where the cliff sensors 234 are located. The cliff sensors 234 can transmit signals to the controller 212 so that the controller 212 can redirect the robot 100 based on signals from the cliff sensors 234.

In some examples, the bump sensor 239a can be used to detect movement of the bumper 238 in one or more directions of the robot 100. For example, the bump sensor 239a can be used to detect movement of the bumper 238 from front to rear or the bump sensors 239b can detect movement along one or more sides of the robot 100. The bump sensors 239 can transmit signals to the controller 212 so that the controller 212 can redirect the robot 100 based on signals from the bump sensors 239.

In some examples, the obstacle follow sensors 241 can detect detectable objects, including obstacles such as furniture, walls, persons, and other objects in the environment of the robot 100. In some implementations, the sensors 241 can be located along a side surface of the body 202, and the obstacle following sensor 241 can detect the presence or the absence an object adjacent to the side surface. The one or more obstacle following sensors 241 can also serve as obstacle detection sensors, similar to proximity sensors. The controller 212 can use the signals from the obstacle follow sensors 241 to follow along obstacles such as walls or cabinets.

The robot 100 can also include sensors for tracking a distance travelled by the robot 100. For example, the sensor system can include encoders associated with the motors 208 for the drive wheels 210, and the encoders can track a distance that the robot 100 has travelled. In some implementations, the sensor can include an optical sensor facing downward toward a floor surface. The optical sensor can be positioned to direct light through a bottom surface of the robot 100 toward the floor surface 50. The optical sensor can detect reflections of the light and can detect a distance travelled by the robot 100 based on changes in floor features as the robot 100 travels along the floor surface 50.

The image capture device 240 can be configured to generate a signal based on imagery of the environment 40 of the robot 100 as the robot 100 moves about the floor surface 50. The image capture device 240 can transmit such a signal to the controller 212. The image capture device 240 can capture images of wall surfaces of the environment so that features corresponding to objects on the wall surfaces can be used for localization.

The controller 212 can use data collected by the sensors of the sensor system to control navigational behaviors of the robot 100 during the mission. For example, the controller 212 can use the sensor data collected by obstacle detection sensors of the robot 100 (e.g., the cliff sensors 234, the bump sensors 239, and the image capture device 240) to help the robot 100 avoid obstacles when moving within the environment of the robot 100 during a mission.

The sensor data can also be used by the controller 212 for simultaneous localization and mapping (SLAM) techniques in which the controller 212 extracts or interprets features of the environment represented by the sensor data and constructs a map of the floor surface 50 of the environment. The sensor data collected by the image capture device 240 can be used for techniques such as vision-based SLAM (VSLAM) in which the controller 212 can extract visual features corresponding to objects in the environment 40 and can construct the map using these visual features. As the controller 212 directs the robot 100 about the floor surface 50 during the mission, the controller 212 can use SLAM techniques to determine a location of the robot 100 within the map by detecting features represented in collected sensor data and comparing the features to previously stored features. The map formed from the sensor data can indicate locations of traversable and non-traversable space within the environment. For example, locations of obstacles can be indicated on the map as non-traversable space, and locations of open floor space can be indicated on the map as traversable space.

The sensor data collected by any of the sensors can be stored in the memory 213. In addition, other data generated for the SLAM techniques, including mapping data forming the map, can be stored in the memory 213. These data produced during the mission can include persistent data that are produced during the mission and that are usable during further missions. In addition to storing the software for causing the robot 100 to perform its behaviors, the memory 213 can store data resulting from processing of the sensor data for access by the controller 212. For example, the map can be a map that is usable and updateable by the controller 212 of the robot 100 from one mission to another mission to navigate the robot 100 about the floor surface 50.

The persistent data, including the persistent map, helps to enable the robot 100 to efficiently clean the floor surface 50. For example, the map enables the controller 212 to direct the robot 100 toward open floor space and to avoid non-traversable space. In addition, for subsequent missions, the controller 212 can use the map to optimize paths taken during the missions to help plan navigation of the robot 100 through the environment 40.

Mapping Examples

Figure 4:
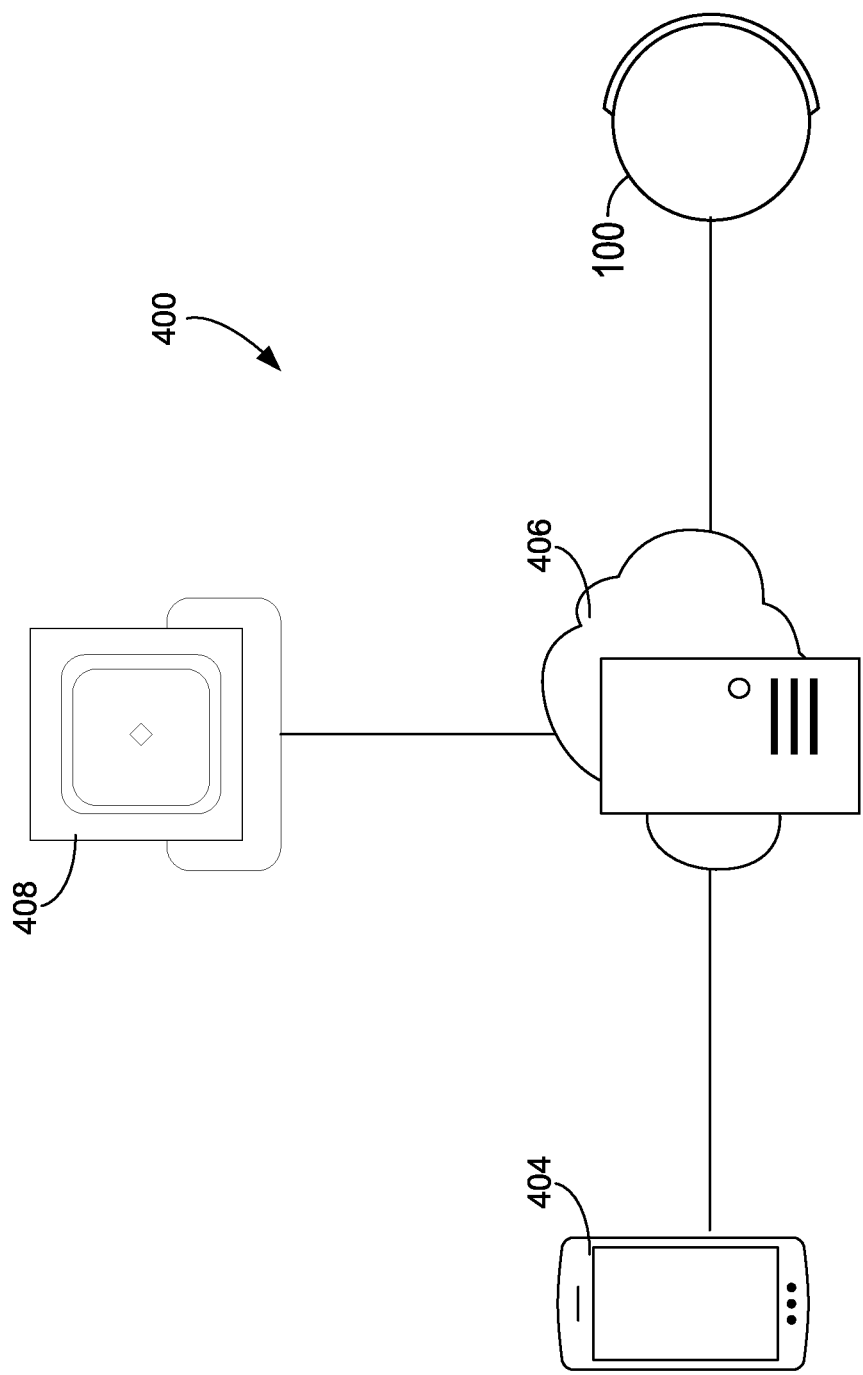
FIG. 4 illustrates a diagram illustrating an example of a communication network in which a mobile cleaning robot operates and data transmission in the network.

FIG. 4 is a diagram illustrating an example of a communication network 400 that can enable networking between the mobile robot 100 and one or more other devices, such as a mobile device 404, a cloud computing system 406, or another autonomous robot 408 separate from the mobile robot 100. Using the communication network 400, the robot 100, the mobile device 404, the robot 408, and the cloud computing system 406 can communicate with one another to transmit and receive data from one another. In some examples, the robot 100, the robot 408, or both the robot 100 and the robot 408 communicate with the mobile device 404 through the cloud computing system 406. Alternatively, or additionally, the robot 100, the robot 408, or both the robot 100 and the robot 408 communicate directly with the mobile device 404. Various types and combinations of wireless networks (e.g., Bluetooth, radio frequency, optical based, etc.) and network architectures (e.g., mesh networks) can be employed by the communication network 400.

In some examples, the mobile device 404 can be a remote device that can be linked to the cloud computing system 406 and can enable a user to provide inputs. The mobile device 404 can include user input elements such as, for example, one or more of a touchscreen display, buttons, a microphone, a mouse, a keyboard, or other devices that respond to inputs provided by the user. The mobile device 404 can also include immersive media (e.g., virtual reality) with which the user can interact to provide input. The mobile device 404, in these examples, can be a virtual reality headset or a head-mounted display.

The user can provide inputs corresponding to commands for the mobile robot 100. In such cases, the mobile device 404 can transmit a signal to the cloud computing system 406 to cause the cloud computing system 406 to transmit a command signal to the mobile robot 100. In some implementations, the mobile device 404 can present augmented reality images. In some implementations, the mobile device 404 can be a smart phone, a laptop computer, a tablet computing device, or other mobile device.

According to some examples discussed herein, the mobile device 404 can include a user interface configured to display a map of the robot environment. A robot path, such as that identified by a coverage planner, can also be displayed on the map. The interface can receive a user instruction to modify the environment map, such as by adding, removing, or otherwise modifying a keep-out zone in the environment; adding, removing, or otherwise modifying a focused cleaning zone in the environment (such as an area that requires repeated cleaning); restricting a robot traversal direction or traversal pattern in a portion of the environment; or adding or changing a cleaning rank, among others.

In some examples, the communication network 400 can include additional nodes. For example, nodes of the communication network 400 can include additional robots. Also, nodes of the communication network 400 can include network-connected devices that can generate information about the environment 40. Such a network-connected device can include one or more sensors, such as an acoustic sensor, an image capture system, or other sensor generating signals, to detect characteristics of the environment 40 from which features can be extracted. Network-connected devices can also include home cameras, smart sensors, or the like.

In the communication network 400, the wireless links can utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel, satellite band, or the like. In some examples, wireless links can include any cellular network standards used to communicate among mobile devices, including, but not limited to, standards that qualify as 1G, 2G, 3G, 4G, 5G, or the like. The network standards, if utilized, qualify as, for example, one or more generations of mobile telecommunication standards by fulfilling a specification or standards such as the specifications maintained by International Telecommunication Union. For example, the 4G standards can correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards can use various channel access methods, e.g., FDMA, TDMA, CDMA, or SDMA.

Operations of the method 800 and other processes described herein, such one or more steps discussed below, can be executed in a distributed manner. For example, the cloud computing system 406, the mobile robot 100, and the mobile device 404 can execute one or more of the operations in concert with one another. Operations described as executed by one of the cloud computing system 406, the mobile robot 100, and the mobile device 404 are, in some implementations, executed at least in part by two or all of the cloud computing system 406, the mobile robot 100, and the mobile device 404.

FIG. 5 illustrates a plan view of a map of an environment. FIG. 5 shows the robot 100 navigating through a room 500 with walls 505a-505l and a bookshelf 510. A global coordinate system is defined by an X-axis and a Y-axis. The walls 505a, 505c, 505e, 505g, 505i, and 505k can be parallel to the X-axis, and the walls 505b, 505d, 505f, 505h, 505j, and 505l can be parallel to the Y-axis. The bookshelf 510 can be located against or near the wall 505j. The robot 100 can estimate its pose within the global coordinate system using the controller 212 as discussed with respect to FIG. 2A. The estimated pose can include a location of the robot within the room 500 and an orientation of the robot 100 relative to the room 500. The location of the robot 100 within the global coordinate system can be defined by x and y. The orientation of the robot can be defined by θ, as measured relative to the X-axis.

Figures 6A, 6B:
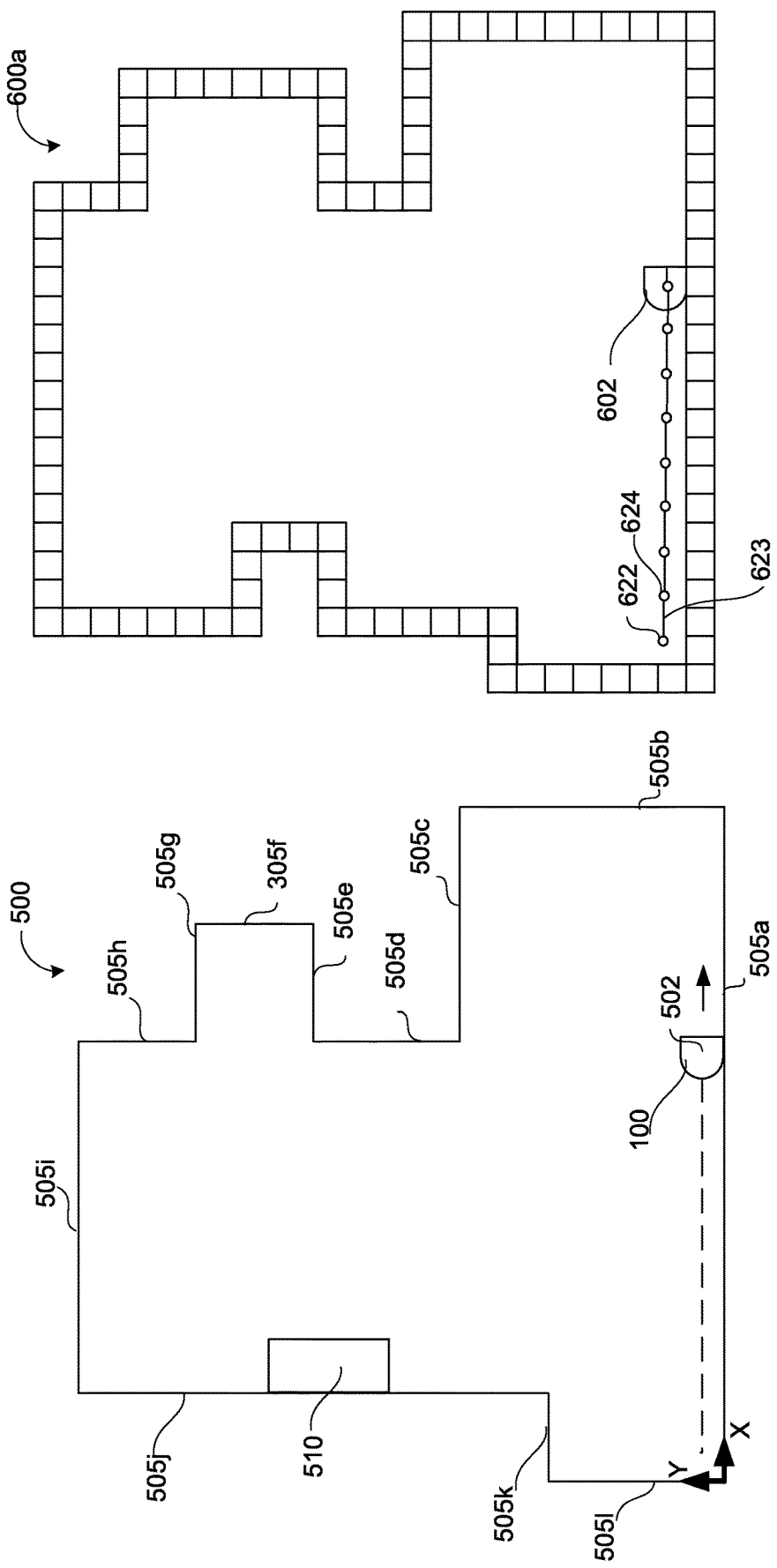
FIG. 6A illustrates a plan view of a map of an environment.
FIG. 6B illustrates a plan view of a map of an environment.

FIG. 6A shows the robot 100 in the room 500 of FIG. 5 as it travels along the wall 505a, such as according to a corresponding occupancy grid 600a of FIG. 6B. The occupancy grid 600a can be a virtual map that the controller (e.g., the controller 212 of FIG. 2A) of the robot 100 or the cloud computing system 406 can generate, such as during a wall following behavior (e.g., the robot traces the traversable perimeter of the room 500 to develop a map of the outer edges of the room 500). A virtual robot 602 can be a virtual representation of the robot 100 within the occupancy grid 600a. A center of the virtual robot 602 can represent an estimated (x, y) location of the robot 100, and a line extending from the center of the virtual robot 602 and through a forward center of the virtual robot 602 can represent the estimated orientation θ of the robot 100.

FIG. 6B shows that the position 502 of the robot 100 within the room 500 can be estimated or determined (e.g., estimated or determined by the controller 212) at least in part using dead reckoning (i.e., without an absolute determination of current position). For example, the position of the robot 100 can be assumed to match a determined position of the virtual robot 602, or the position of the robot 100 can be determined to be within an error bound of the position of the virtual robot 602. The position of the virtual robot can be determined (e.g., using the controller 212) based upon one or more robot sensors or features (e.g., encoders 209, cliff sensors 234, bump sensors 239, image capture device 240, optical travel indicators, etc.).

As shown in FIG. 6B, the virtual robot 602 can start at a starting node 622, such as a specified, calibrated, or estimated position. The position of the starting node 622 can be determined with a specified level of accuracy, such as through user input, robot sensors, or the like. The starting node can include robot pose information, such as position or location and orientation. The starting node can be recorded in a memory, such as the memory 213.

From the starting node 622, the robot 100 can travel for a specified period of time where the virtual robot 602 can move within the occupancy grid 600a as the robot 100 moves a specified distance before recording a first node 624. The first node 624 can include similar information to the starting node 622 (i.e., position, orientation), and can also be stored in memory. One or more pieces of information comprising the first node 624 can be determined using one or more pieces of the starting node 622 or a first travel indicator 623 (e.g., determined using dead reckoning). The first travel indicator 623 can include robot travel information, such as a determined or estimated distance that the virtual robot 602 has traveled since the virtual robot 602 left the starting node 622. For example, the robot 100 can be able to determine a distance the robot has traveled (e.g., using the wheel encoders 209, optical travel indicators, or the like) to determine a value of the first travel indicator 623. Using the starting node 622 and the first travel indicator 623, the robot 100 can determine the first node 624, such as by adjusting a location of the first node 624 based upon the location and orientation of the starting node 622 and the distance of the first travel indicator 623 (e.g., determine the position of the first node 624 by adjusting the location of the starting node 622 by the length of the first travel indicator 623 in the direction of θ in the starting node 622). The orientation of the robot 100 can be determined using a gyroscope mounted on the robot 100, such as by using a dead reckoning technique. The orientation of the robot 100 can also be determined using one or more sensors, such as the encoders 209 (e.g., if the encoder on the drive wheel 210a indicates more travel than the encoder on the drive wheel 210b, calculate the turn of the robot 100). The above dead reckoning technique (e.g., nodes and travel indicators) is an example of a method of determining position, but this disclosure is believed to apply to a variety of dead reckoning and position determination techniques.

By using a dead reckoning technique, such as the one discussed above, the position 502 of the robot 100 can be determined or estimated (e.g., using the controller 212). The dead reckoning technique can be recalibrated, such as by determining a new starting node 622 with a higher degree of accuracy than the current dead reckoning node (e.g., the robot 100 recalibrates using user input, sensors, etc.). Periodically, the dead reckoning technique may include marginalizing one or more nodes or travel indicators, such as to reduce the amount of data storage required. Marginalization may include combining one or more nodes or one or more travel indicators. For example, five nodes connected by four travel indicators can be marginalized to two nodes connected with a single travel indicator. The starting and ending nodes can be in the same location, resulting in no loss of robot position information. The robot 100 can persist (i.e., record without deleting) a specified number of nodes or travel indicators before marginalization, such as may allow for the correction of incorrect nodes or travel indicators.

While the use of a dead reckoning technique can allow for position determination without absolute position information, an error or misinterpretation of data used to determine position information can result in an error in the determined position. For example, if the robot 100 is determined to be moving (e.g., the drive wheels 210 are spinning and turning the encoders 209), but the robot is actually in a stasis condition (e.g., a stationary or abnormal condition), nodes and travel indicators can be generated that incorrectly reflect the position of the robot. Problematically, these nodes can be included on the occupancy grid 600a, creating inaccuracies in the occupancy grid 600a, which can cause future navigational problems. The systems and methods below help to address these issues.

Figure 7:
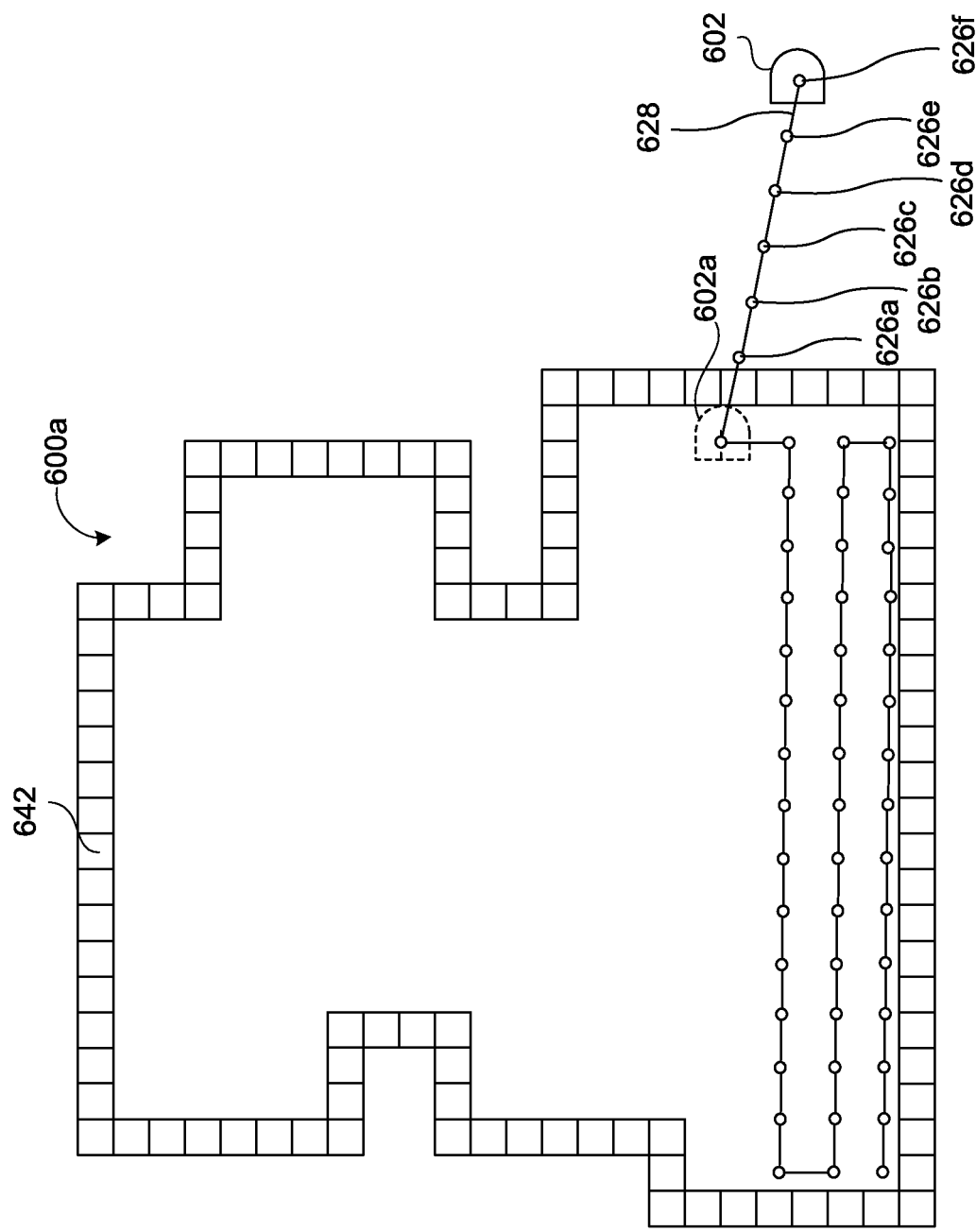
FIG. 7 illustrates a plan view of a map of an environment.

FIG. 7 shows an example of a robot stasis condition resulting in inaccurate robot position information. FIG. 7 shows that the determined position of the virtual robot 602 is outside of traversable boundaries of the room (i.e., the robot would have to go through wall 505b to reach the determined position). The correct position of the virtual robot 602 is shown as correct position 602a. While executing a turn, such as during a cleaning mission, the robot 100 may have become stuck (e.g., stuck due to floor conditions, an obstacle, etc.) or disoriented (e.g., the determined pose of the robot is incorrect). After becoming stuck or disoriented, the robot 100 can attempt to continue the mission (e.g., keep driving drive wheels 210), but the robot may not be able to move properly (e.g., because it is mechanically stuck, trying to drive through a wall, etc.). Additionally, the position of the robot 100 can continue to be determined using the dead reckoning technique. However, because the robot 100 is not actually moving as expected, the position(s) determined using the dead reckoning technique can be incorrect.

For example, the robot 100 (e.g., using the controller 212) can generate nodes 626a-626f, with travel indicators 628 between each of the nodes 626. The nodes 626 can be located outside the traversable space of the environment 40, e.g., beyond the map 642. This incorrect position information can adversely affect the cleaning mission, such as by missing portions of an area to be cleaned, decreasing battery life, or forcing the robot to wait for user input. The incorrect position information may also adversely affect the map 642, such as by updating the map 642 to indicate that the robot can travel to a non-traversable area.

Figure 8:
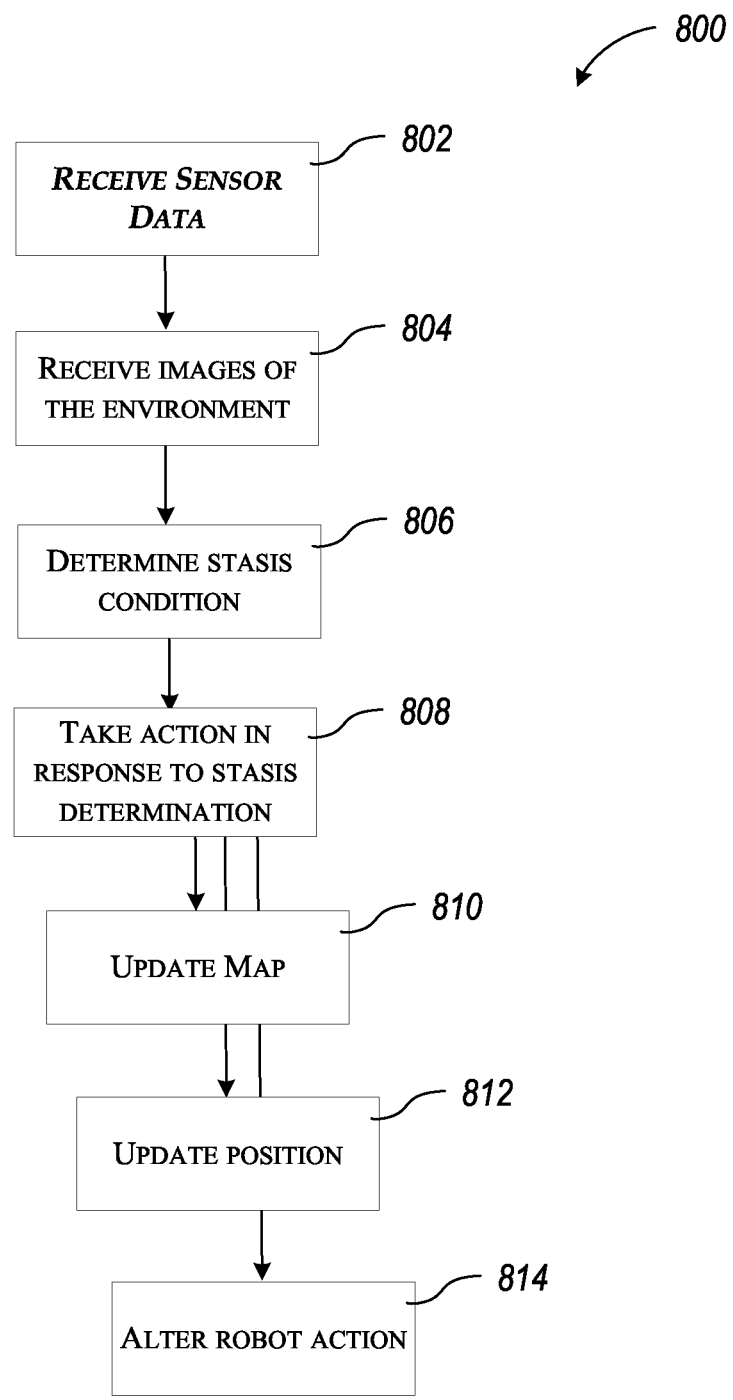
FIG. 8 illustrates a schematic view of a process of developing or refining a map of an environment.

FIG. 8 illustrates a schematic view of the method 800, in accordance with at least one example of this disclosure. The method 800 can be a method of modifying a map of an environment (or of creating a map of an environment). The steps or operations of the method 800 are illustrated in a particular order for convenience and clarity; many of the discussed operations can be performed in a different sequence or in parallel without materially impacting other operations. The steps or operations of the method 800 can be omitted or can be performed multiple times. The method 800 as discussed includes operations that can be performed by multiple different actors, devices, and/or systems. It should be understood that subsets of the operations discussed in the method 800 can be attributable to a single actor, device, or system, or could be considered a separate standalone process or method.

The method 800 can be performed by one or more of the robot 100, the cloud computing system 406, or the mobile device 404. The method 800 can begin at step 802, where sensor data can be received. The sensor data can be received by the controller 212, such as from one or more sensors on the robot 100. The sensor data can include data based on the interaction between the robot 100 and the environment. The sensor data can be used, such as to determine a position of the robot 100 or generate a map 642. The sensor data can be used in a dead reckoning technique, such as discussed above.

At step 804, images of the environment can be received. The images of the environment can be captured by the image capture device 240 and received by the controller 212. The image capture device 240 can be generally stationary with respect to the robot 100, and therefore can capture images based on the position or orientation of the robot 100. The image capture device 240 can be oriented towards the front portion 202a of the robot 100 and can capture features of the environment generally ahead of or generally above the robot 100. One image can be received per node, such as an image captured at approximately the same time as the node is recorded. More than one image can be received between nodes, such as a continuous stream of images recorded at a specified interval, such as may not depend upon the recording of nodes. Optionally, one image can be received per node.

At step 806, it can be determined whether the robot 100 is in a stasis condition, such as using the images received in step 804 and the sensor data received in step 802. For example, the controller 212 can use a technique, such as an image processing technique, to determine if the robot is stationary or operating abnormally. When the robot is stuck against a wall or other obstruction and the drive wheels 210 are operating, the robot can wobble, rotate, or oscillate back and forth (e.g., the robot is not entirely stationary). The change in orientation(s) can result in little change in position or location but greater change in orientation. This change in orientation can cause the images to look different even though the robot 100 is in stasis. However, due to the oscillating motion of the robot 100, images from farther ago in time can look similar to a present image. The robot 100 can compare one or more images to help determine if the robot is stationary, such as determining that the robot is in stasis if two images have a degree of similarity above a threshold. A technique for determining the stasis condition of the robot is discussed below. In an example, one or more of an optical sensor configured for detecting motion of the robot or the wheel encoders 209 can be used to determine if the robot is in a stasis condition. The optical sensor, wheel encoders 209, or one or more images can be used to determine whether the robot is in stasis.

At step 808, an action can be taken in response to the stasis determination. If the robot is determined to not be in stasis at step 806, the stasis determination can continue recurrently without taking any actions in response to stasis until a stasis condition is determined. Examples of actions that can be taken in response to a stasis determination include updating the map 642 at step 810, updating the determined position of the robot 100 at step 812, or altering a robot action at step 814. In an example, more than one of these actions can be taken. In an example, other actions can be taken alternatively or in addition to these actions.

At step 810, updating the map 642 can include updating a previously generated map or updating a map that is currently being generated. For example, a previously generated map can include one or more non-traversable areas that the robot 100 attempts to access on missions but is unsuccessful in doing so, such as due to undetected stasis. If on a mission, stasis is detected, such as while attempting to access a portion of the map, the previously generated map can be updated to remove all or a portion of the incorrect data, such as poses, locations, travel indicators, or the like. If the map 642 is being generated, and the robot 100 detects a stasis condition, the map 642 can be generated to leave out a portion or all of the area that the virtual robot 602 traversed while the robot 100 was in stasis.

At step 812, the determined location of the robot 100 can be updated, such as by updating the location of the virtual robot 602. For example, the robot 100 can be attempting to complete a cleaning mission based upon a previously defined map 642, and can enter a stasis condition. While in the stasis condition, the determined location of the robot 100 can become inaccurate, which can result in a portion of the remaining mission failing or being completed incorrectly (e.g., failing to clean the entire area that was to be cleaned). By updating the determined position of the robot 100 based upon the stasis determination to the correct position of the robot 100 or a more accurate position, the remaining mission can be completed successfully or more successfully (e.g., more of the area is cleaned correctly than if stasis was not determined and corrected for) and future missions using the map 642 can be completed more effectively or efficiently.

At step 814, an action of the robot 100 can be altered. For example, the robot can take an action that it would not have taken if stasis was not detected. The action can be physical, such as an evasive maneuver to try to become unstuck (e.g., conducting a spin for a specified length of time) or redetermine or recalibrate a portion or all of a pose (e.g., travel to a recalibration point, such as a corner). The robot can also generate and transmit an alert that the robot is stuck. The robot can attempt to recalibrate the current position, such as by going to a calibration point. The action can also be a non-physical action, such as a change in recorded values, control flow, or system operations. For example, the robot can reduce a confidence level ascribed to one or more nodes or travel indicators.

Figure 9:
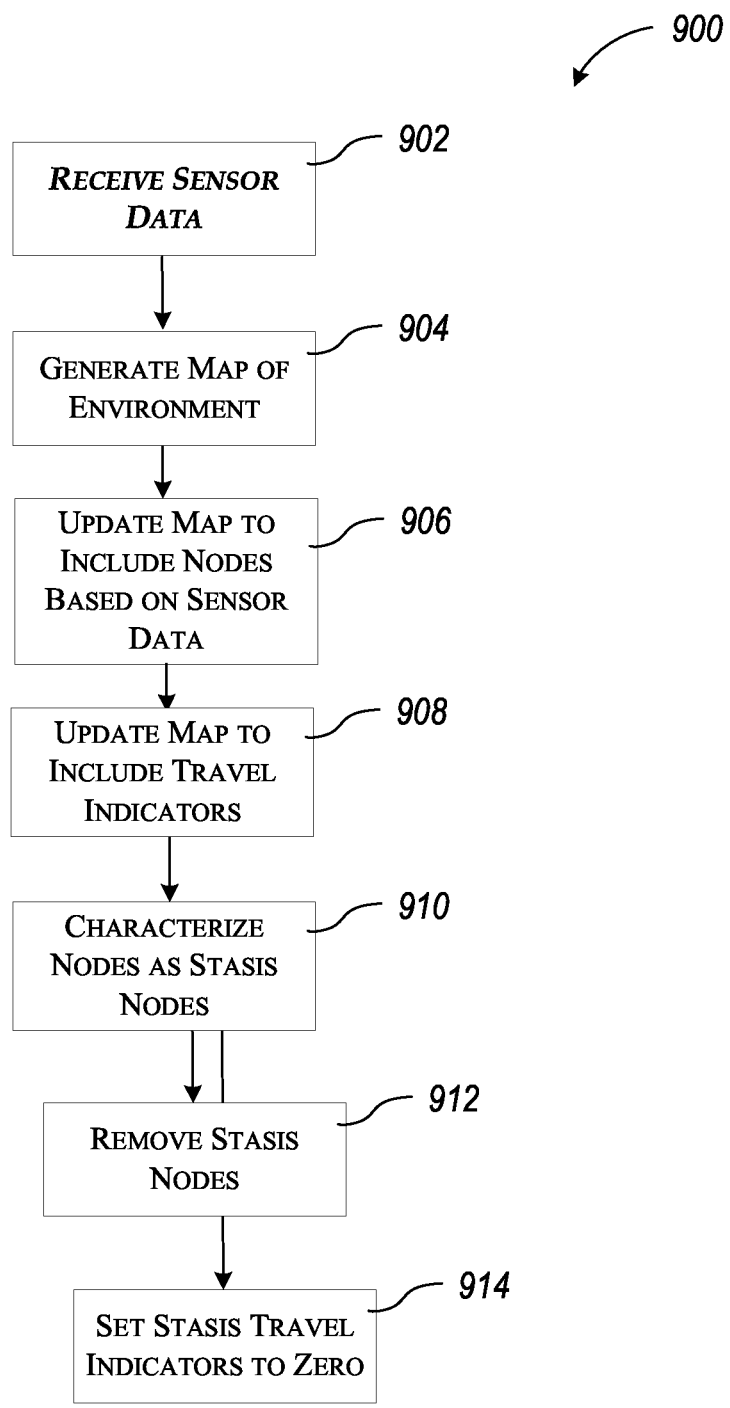
FIG. 9 illustrates a schematic view of a process of developing or refining a map of an environment.

FIG. 9 illustrates a schematic view of the method 900, in accordance with at least one example of this disclosure. The method 900 can be a method of modifying a map of an environment, or of creating a map of an environment. The steps or operations of the method 900 are illustrated in a particular order for convenience and clarity; many of the discussed operations can be performed in a different sequence or in parallel without materially impacting other operations. The steps or operations of the method 900 can be omitted or can be performed multiple times. The method 900 as discussed includes operations that can be performed by multiple different actors, devices, and/or systems. It should be understood that subsets of the operations discussed in the method 900 can be attributable to a single actor, device, or system, or could be considered a separate standalone process or method.

The method 900 can be performed by one or more of the robot 100, the cloud computing system 406, or the mobile device 404, and can include or can be part of one or more of the steps of the method 800 discussed above, such as step 810, but can be part of any step of the method 800 or the method 900 can stand alone. The method 900 can begin at step 902, where sensor data can be received. The sensor data can be received by the controller 212, such as from one or more sensors on the robot 100. The sensor data can include data based on the interaction between the robot 100 and the environment.

At step 904, a map 642 of the environment can be generated, such as based on the received sensor data. The map 642 of the environment can be generated from scratch, or can be generated by updating a previously generated map. The map 642 can include one or more of a traversable perimeter map, a mission map (e.g., a map for the path to take while carrying out a cleaning mission), or the like. The map 642 can be created using SLAM or VSLAM, as discussed above. At step 906, the map 642 can be updated to include one or more nodes (e.g., the nodes 622-626) such as based on a location of the robot 100 in the environment, which can be determined using the sensor data received in step 902.

At step 908, the map 642 can be updated to include one or more travel indicators between adjacent nodes, such as the first travel indicator 623. The travel indicators determined in step 908 can indicate a distance or angle between one or more nodes determined in step 906 (e.g., according to the dead reckoning technique discussed above).

At step 910, one or more nodes can be characterized as stasis nodes, or one or more travel indicators can be characterized as stasis travel indicators when it is determined that the robot 100 is in a stasis condition. In an example, one or more nodes are characterized as stasis nodes and at least one travel indicator is characterized as a stasis travel indicator. The characterization can include flagging or otherwise marking the nodes or travel indicators as stasis nodes, and may not be required to include further action.

At step 912, one or more of the stasis nodes or stasis travel indicators can be minimized (or optionally removed) such as by reducing the distance traveled including optionally reducing the distanced traveled to zero, which can result in a more accurate location determination of the robot 100 or a more accurate map 642. For example, the dead reckoning technique can include removing travel information for times when the robot was determined to be in stasis. The nodes and travel indicators can be marked as stasis nodes and stasis travel indicators if it can be determined that the whole preceding travel indicator was generated when the robot 100 was in stasis. If stasis started in the middle of a travel indicator, the travel indicator may not be marked as a stasis travel indicator, or can be marked as a stasis travel indicator. Because the nodes and travel indicators can be treated as undividable elements, the coarseness of the stasis correction can be determined by the length of the travel indicators. For example, an entire travel indicator can either be preserved or discarded, even though stasis began in the middle of the travel indicator. This can result in an error regardless of whether the travel indicator is preserved or removed. Decreasing the length of time or distance between nodes can reduce the coarseness of the correction. In an example, a travel indicator can be divided into more than one travel indicator, including intermediate nodes, to attempt to reduce the coarseness of removing a travel indicator.

In an example, the stasis nodes and stasis travel indicators can be preserved or persisted, but a length of the stasis travel indicators can be reduced or can be set to zero at step 914. This can have an effect of keeping the determined position of the robot 100 constant during stasis, or reducing the error in the position of the robot 100.

The image processing technique used to determine stasis at step 806 can include comparing two or more images using one or more image processing techniques to determine if two or more of the two or more images were taken from the same position or approximately the same position. In an example, the image processing technique can include comparing one or more gradients of the two or more images. For example, a value (e.g., intensity at a specific color, overall intensity, etc.) for a pixel or group of pixels can be compared to a value of a neighboring pixel or group of pixels. The relative difference can define the gradient between pixels. Equation 1 defines a relative difference of gradient score of the positive gradient in the horizontal direction between a first image $I_i$ and a second image $I_j$.

$$s^{x+}(I_i, I_j) = \frac{|(g^{x+}(I_i) - g^{x+}(I_j)_{>\theta}|}{|(g^{x+}(I_i)_{>\theta}|+|g^{x+}(I_j)_{>\theta}|} \qquad \text{Equation 1}$$

In equation 1, $g^{x+}$ represents the positive gradient in the horizontal direction of the pixels in the images, and $|g>\theta|$ represents the cardinality of the set of pixels in g with an absolute value larger than $\theta$. For example, the portion of equation 1 above the division bar is equal to the number of gradients in the images that differ by an amount greater than $\theta$. The portion of equation 1 below the division bar is equal to the sum of the gradients in the images alone that exceed $\theta$. The value of $\theta$ can be specified or tuned, such as by using a machine learning method. In an example, $\theta$ can be 0.05, 0.1, 0.5, 1, 1.5 or 2. The domain of equation 1 ranges from 0 when the images are identical to 1 when none of the image gradients overlap.

Equation 2 can define a total relative difference of gradient score between a first image $I_i$ and a second image $I_j$.

$$s(I_i, I_j) = \sqrt{(s^{x+})^2 + (s^{x-})^2 + (s^{y+})^2 + (s^{y-})^2} \qquad \text{Equation 2}$$

Equation 2 can define the total relative difference of gradient score as the root of the squares of each of the relative difference of gradient scores in the positive horizontal gradient ($s^{x+}$), the negative horizontal gradient ($s^{x-}$), the positive vertical gradient ($s^{y+}$), and the negative vertical gradient ($s^{y-}$). Positive can be defined as a light to dark transition or a dark to light transition of pixels, with negative being defined oppositely from positive. Each of the individual gradient scores can be calculated similarly to equation 1. The domain of the total relative difference of gradient scores can range from 0 when the images are identical to 2 (or 1 in other examples) when none of the gradients overlap.

The total relative difference in gradient score, such as determined according to Equation 2, can be compared to a threshold to determine whether the robot 100 is in stasis. Because a lower total relative difference of gradient score can correspond to a greater similarity between images, scores below the threshold can result in determining that the robot 100 is in stasis. The threshold can be determined empirically, such as through testing and calibration in different environments and conditions. The threshold can be determined through machine learning, such as can include training with samples and hard coding a threshold or machine learning during use, such as use by an end user in the end user's environment. The threshold can be adaptive, such as can result in the threshold increasing or decreasing based upon one or more conditions. In an example, the threshold can be increased or decreased based upon the overall ambient light detected by the robot 100. For example, low light can make it more likely to detect a false positive of stasis, such as due to lower average image gradient, so the threshold can be lowered (i.e., the images must be more similar to determine the robot 100 is in stasis). In an example, stasis detection can be turned off or disabled if it is too dark. In an example, the threshold can be increased or decreased based upon the measurements of the gyroscope. For example, the gyroscope can detect more angular variation when the robot is oscillating against a while. Therefore, when the gyroscope detects more variation, it can be more likely that the robot is in a stasis condition, and the threshold can be increased (i.e., the images do not have to be as similar to determine the robot 100 is in stasis).

In an example, the method 800 can include generating a queue of images, such as corresponding to a specific time interval, with particular images being associated with one or more nodes. The queue of images can include N images. For example, the method 800 can include queuing 22 images corresponding to a specific time interval (e.g., images taken recurrently at a specified interval to achieve 22 images during the specified time interval), with each image corresponding to the generation of a node. In an example, the node generation may not be sequenced to image collection and a given image can be assigned to the previous node, the next node, or the nearest node in time. The method 800 can include comparing one or more of the 22 images to one or more of the remaining 21 images.

In an example, each of the 11 most recent images can be compared to the 11 images previous from each image. A 11-by-11 array of scores can be created to organize the values, with each column corresponding to one of the 11 most recent images and each column corresponding to the nth previous image. Respective array elements can correspond to the total relative difference of gradient scores for the image of the column and the image of the row. Comparing images to more than one other image can allow for one or more of increased accuracy (e.g., decreased false negative rate or decreased false positive rate), detection of conditions when the robot is stationary in position but oscillating in orientation (e.g., because the images do not overlap until the oscillation has made a partial or complete cycle and the image capture device 240 is aimed at the same or similar location as during a previous image capture).

Alternatively or additionally, the comparison of more than two images can allow for the robot 100 to continue operating during stasis determinations, such as by making the stasis determination a lower priority task or a recurrent or non-continuous task. For example, the robot 100 can prioritize other operations and only conduct stasis determinations when processing bandwidth allows. This can be benefitted by having a queue of images because each image may not be analyzed as it is received.

In an example, N can equal any number, such as 5, 10, 15, 20, 25, 30, 40, 50 or 100. In an example, one or more images can be compared with any one or more remaining images in the queue, and the resulting data may not generate a square array. For example, the first images can be compared to all the other images in the queue, the second image can be compared to all the earlier images, and so on to generate a stepped array. In an example, one or more comparisons can be skipped or conducted in a different way.

In one example, the robot 100 (or a controller 212 thereof) can generate the map 642 of the environment based on the sensor data. The robot 100 can update the map 642 to include one or more nodes (e.g., the nodes 622-626) based on a location of the mobile cleaning robot 100 in the environment based on the sensor data. The robot 100 can update the map 642 to include one or more travel indicators

628 between adjacent nodes based on the sensor data. The robot 100 can characterize at least one of the one or more nodes as stasis nodes and characterize at least one of the travel indicators as stasis travel indicators when it is determined that the mobile cleaning robot 100 is in the stasis condition.

The robot 100 can also execute or generate instructions to further cause the processing circuitry (e.g., the controller 212) to perform operations to remove the stasis nodes and the stasis travel indicators following the stasis determination to update the map 642. The robot 100 can set a value of the one or more stasis travel indicators to zero following the stasis determination to update the map 642. The robot 100 can generate a queue of the images over a time interval, particular images associated with one or more nodes. The robot 100 can characterize at least one of the images as a stasis image associated with at least one of the stasis nodes when it is determined that the mobile cleaning robot 100 is in the stasis condition. The robot 100 can delete the stasis image from the queue.

The robot 100 can persist remaining nodes, images, and travel indicators following removal of the stasis images from the queue. The robot 100 can compare a first gradient of a first image to a second gradient of a second image to determine whether the mobile cleaning robot is in a stasis condition.

Or, the robot 100 can determine a first vertical gradient and a first horizontal gradient of one or more images of a first group of images. The robot 100 can determine a second vertical gradient and a second horizontal gradient of one or more images of a second group of images. The robot 100 can determine whether the mobile cleaning robot 100 is in a stasis condition based on the first vertical gradient and the first horizontal gradient of one or more images of the first group of images and based on the second vertical gradient and the second horizontal gradient of one or more images of the second group of images.

The robot 100 can also determine a first vertical gradient and a first horizontal gradient of one or more images of a first group of images. The robot 100 can determine a second vertical gradient and a second horizontal gradient of one or more images of a second group of images. The robot 100 can assign a first score value to each image of the first group of images based on the first vertical gradient and the first horizontal gradient of that image. The robot 100 can assign a second score value to each image of the second group of images based on the second vertical gradient and the second horizontal gradient of that image. The robot 100 can compare the first score value of each of the images of the first group of images to the second score value of each of the images of the second group of images. The robot 100 can then determine whether the mobile cleaning robot 100 is in a stasis condition based on the comparison of the first score values to the second score values.

Optionally, the robot 100 can determine corresponding first gradients including first vertical gradients and a first horizontal gradients of one or more images of a first group of images. The robot 100 can determine corresponding second gradients including second vertical gradients and a second horizontal gradients of one or more images of a second group of images. The robot 100 can compare each of the first gradients to each of the second gradients to determine one or more score values corresponding to the one or more comparisons. The robot 100 can determine whether the mobile cleaning robot is in a stasis condition based on the one or more score values.

FIG. 10 illustrates an example of a score array 1000. In FIG. 10, $I\_1$ represents the most recent image, $I\_2$ represents the second most recent image, and so on. The first column contains the scores of comparisons involving the first image, the second column contains scores of comparisons involving the second image, and so on. A comparison (e.g., a comparison according to equation 2) is denoted with "vs," for example $I\_1$ vs $I\_2$ is a comparison of the first image and the second image. The score array 1000 can have a specified number of columns and a specified number of rows. The score array 1000 may not need to be square.

The stasis determination can be made by analyzing the score array 1000. For example, the controller 212 can determine stasis using one or more of the minimum score of the first column, the maximum score of the first column, the mean of the minima of two or more of the columns (e.g., up to and including all the columns), or another array based operation. Other array-based operations can include a ratio of the high frequency components of the matrix to the overall magnitude of the matrix. In addition, the controller 212 can be trained to recognize arrays indicating stasis, such as through machine learning, or the controller can be hard-coded with data resulting from the training of another device.

In an example, the robot 100 can be determined to be in stasis if the maximum score of the first column is below a threshold. This can indicate that there is little variation between the most recent image and the past images. If the minimum score of the first column is below a threshold, the robot 100 can be determined to be in stasis. However, if some scores in the first column are above the threshold, this may indicate that the robot is oscillating, and only some of the images overlap sufficiently for the score to indicate stasis.

If the robot is oscillating, vibrating, or in another hard to detect stasis condition, it can be helpful to look beyond the first column of the matrix. For example, taking the mean of the minima of all the columns can allow for a broader comparison, or a comparison that looks farther back in time. A low mean of the minima of all columns can be indicative of stasis, however, this alone may not be sufficient to determine stasis. It can be helpful to also analyze the ratio of high frequency components in the matrix, and declare stasis if the high frequency ratio exceeds a threshold and the mean of minima is below a threshold.

In an example, if two adjacent images at one position in the queue (e.g., images eight and nine) have a score below the threshold and two images at a different position in the queue (e.g., images three and four) have a score below the threshold, one or more intermediate images (e.g., images four through eight) can be determined to be stasis images and treated as if their comparisons were below the threshold regardless of their determined scores. For example, if the robot is determined to be in stasis at one point in time, and a period of time later (e.g., 5 seconds) it is determined to be in stasis again, it can be determined that the robot was in stasis during the intermediate time, even if stasis was not detected.

An image can be characterized as a stasis image if its similarity with a previous image (e.g., such as determined using the score generated by equation 2) is less than the threshold. When an image is characterized as a stasis image, one or more nodes or travel indicators associated with the image can be characterized as stasis nodes or stasis travel indicators. Following the stasis determination, the stasis image can be deleted from the queue. Following the handling of the stasis nodes, stasis travel indicators, and stasis images, the remaining nodes can be marginalized. Marginalizing can be delayed until after the stasis determination is made and action is taken to allow for better handling of the stasis determination and actions (e.g., if nodes are marginalized before the stasis determination, the information necessary to remove stasis nodes may not be available).

Figure 11:
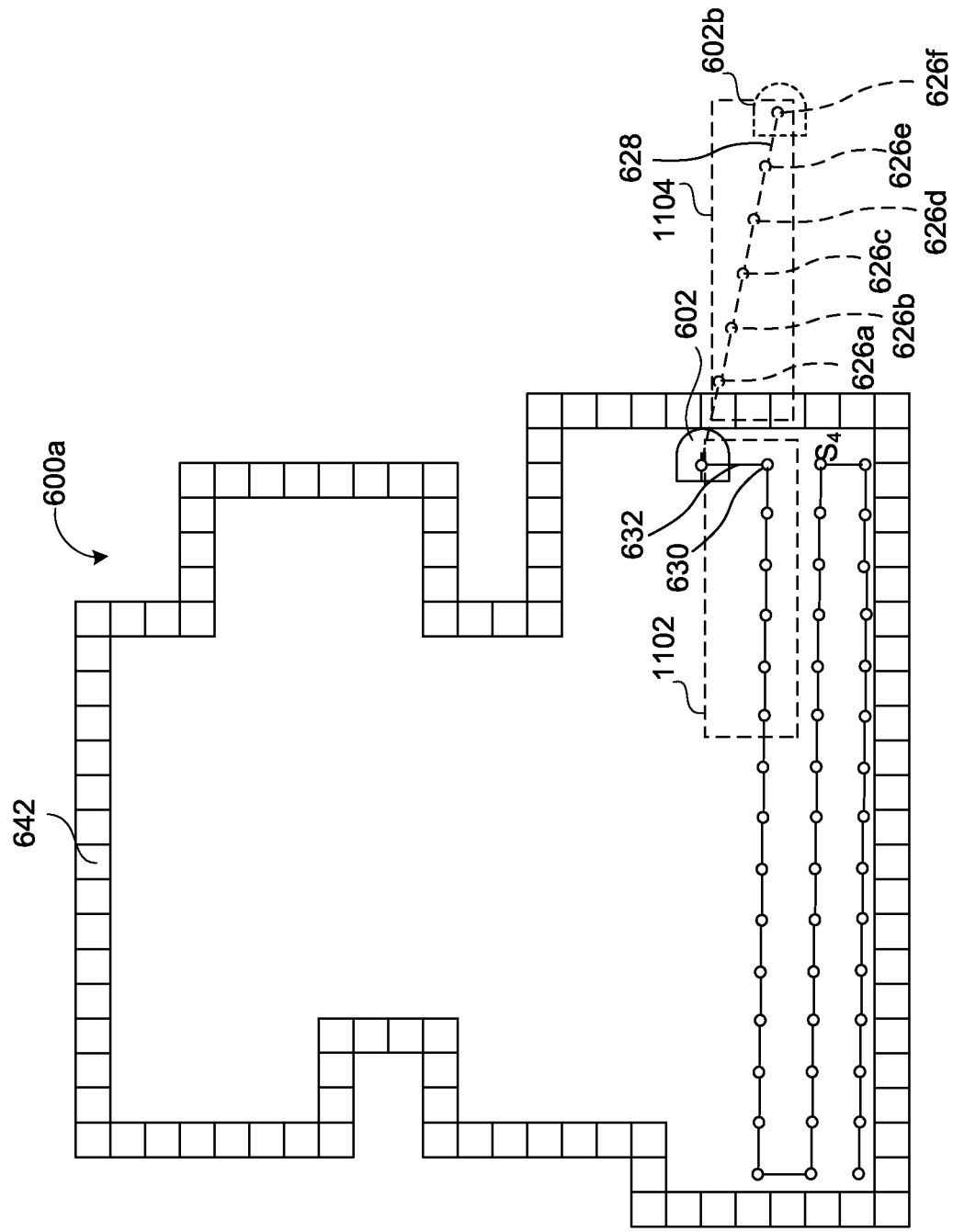
FIG. 11 illustrates a plan view of a map of an environment.

FIG. 11 shows an example of a robot taking an action in response to the stasis condition shown in FIG. 7. FIG. 10 shows that the robot 100 determined that one or more nodes 626a-626f or travel indicators 628 in a region 1104 were stasis nodes or stasis travel indicators (e.g., determined stasis using one or more of the methods described herein). Following the stasis determination, the robot 100 removed or otherwise accounted for the one or more nodes or travel indicators in region 1104 (e.g., deleted nodes, deleted travel indicators, set travel indicator length to zero, etc.). Following the removal of the one or more nodes or travel indicators in region 1104, the determined position of the virtual robot 602 can be moved towards the correct position 602a from the incorrect position 602b. The position of the virtual robot 602 can match the correct position 602a, or can differ from the correct position 602a, such as can be due to a delay in determining stasis or a granularity of the stasis correction. FIG. 10 shows that one or more nodes (e.g., persisted node 630) or travel indicators (e.g., persisted travel indicator 632) of region 1102 were determined not to be stasis nodes or travel indicators, and no action was taken with respect to these nodes and travel indicators.

Figure 12:
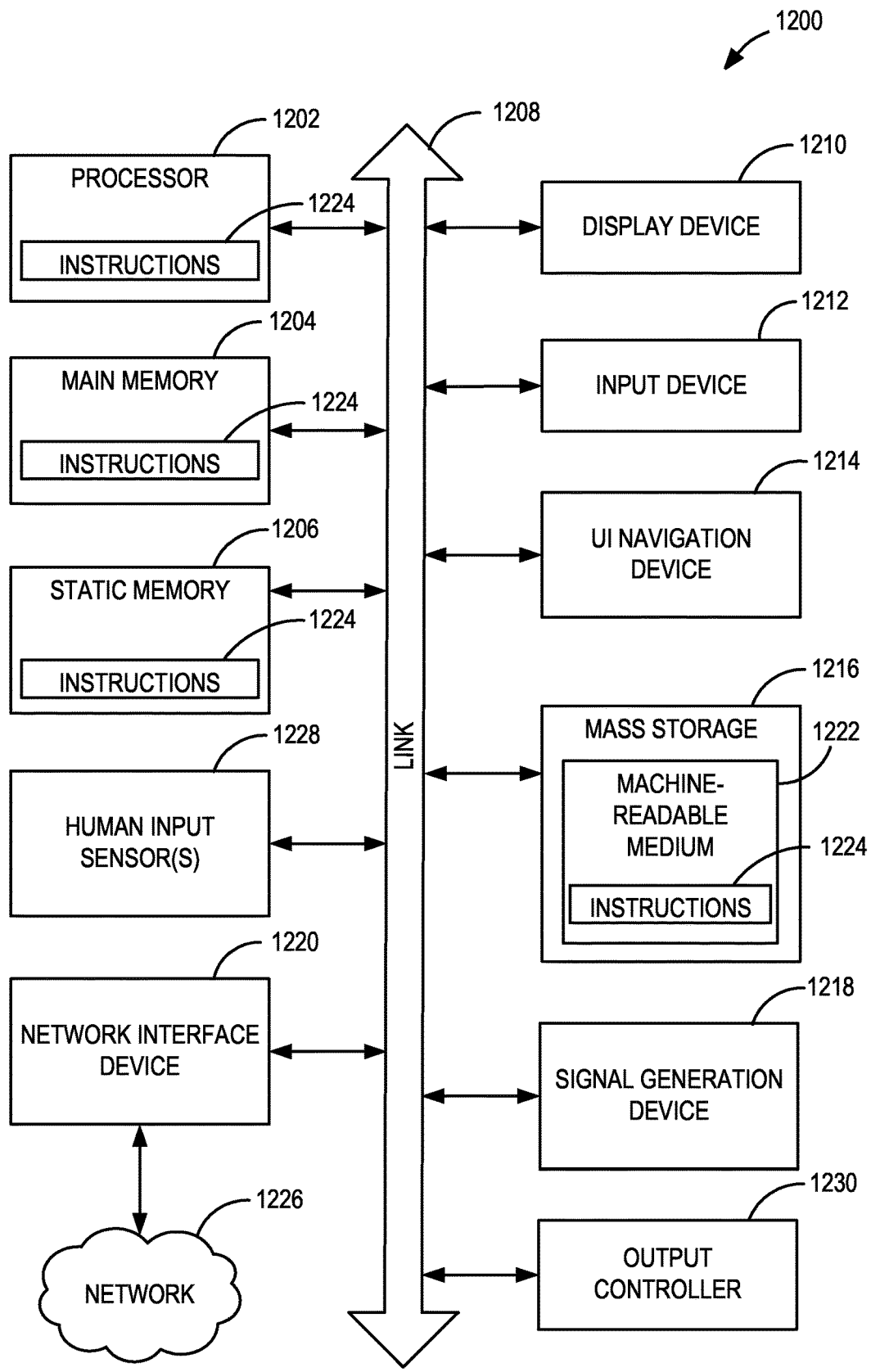
FIG. 12 illustrates a block diagram illustrating an example of a machine upon which one or more embodiments can be implemented.

FIG. 12 illustrates a block diagram of an example machine 1200 upon which any one or more of the techniques (e.g., methodologies) discussed herein can perform. Examples, as described herein, can include, or can operate by, logic or a number of components, or mechanisms in the machine 1200. Circuitry (e.g., processing circuitry) is a collection of circuits implemented in tangible entities of the machine 1200 that include hardware (e.g., simple circuits, gates, logic, etc.). Circuitry membership can be flexible over time. Circuitries include members that may, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1200 follow.

In alternative embodiments, the machine 1200 can operate as a standalone device or can be connected (e.g., networked) to other machines. In a networked deployment, the machine 1200 can operate in the capacity of a server machine, a client machine, or both in server-client network environments. In an example, the machine 1200 can act as a peer machine in peer-to-peer (P2P) (or other distributed) network environment. The machine 1200 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1200 can include a hardware processor 1202 (e.g., a central processing unit (CPU), a graphics processing unit (GPU), a hardware processor core, or any combination thereof), a main memory 1204, a static memory (e.g., memory or storage for firmware, microcode, a basic-input-output (BIOS), unified extensible firmware interface (UEFI), etc.) 1206, and mass storage 1216 (e.g., hard drive, tape drive, flash storage, or other block devices) some or all of which can communicate with each other via an interlink (e.g., bus) 1208. The machine 1200 can further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 can be a touch screen display. The machine 1200 can additionally include a storage device (e.g., drive unit) 1216, a signal generation device 1218 (e.g., a speaker), a network interface device 1220, and one or more sensors 1216, such as a global positioning system (GPS) sensor, compass, accelerometer, or other sensor. The machine 1200 can include an output controller 1230, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1202, the main memory 1204, the static memory 1206, or the mass storage 1216 can be, or include, a machine readable medium 1222 on which is stored one or more sets of data structures or instructions 1224 (e.g., software) embodying or utilized by any one or more of the techniques or functions described herein. The instructions 1224 can also reside, completely or at least partially, within any of registers of the processor 1202, the main memory 1204, the static memory 1206, or the mass storage 1216 [1208] during execution thereof by the machine 1200. In an example, one or any combination of the hardware processor 1202, the main memory 1204, the static memory 1206, or the mass storage 1216 can constitute the machine readable media 1222. While the machine readable medium 1222 is illustrated as a single medium, the term "machine readable medium" can include a single medium or multiple media (e.g., a centralized or distributed database, and/or associated caches and servers) configured to store the one or more instructions 1224.

The term "machine readable medium" can include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 can be further transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1220 can include one or more physical jacks (e.g., Ethernet, coaxial, or phone jacks) or one or more antennas to connect to the communications network 1226. In an example, the network interface device 1220 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software. A transmission medium is a machine readable medium.

NOTES AND EXAMPLES

The following, non-limiting examples, detail certain aspects of the present subject matter to solve the challenges and provide the benefits discussed herein, among others.

Example 1 is at least one non-transitory machine-readable medium, including instructions, which when executed, cause processing circuitry to perform operations to: receive sensor data from a mobile cleaning robot based on interaction between the mobile cleaning robot and an environment; receive images of the environment from an image capture device of the mobile cleaning robot; determine whether the mobile cleaning robot is in a stasis condition based on the images and the sensor data; and update a map of the environment based on the stasis determination.

In Example 2, the subject matter of Example 1 optionally includes the instructions to further cause the processing circuitry to perform operations to: generate the map of the environment based on the sensor data; update the map to include one or more nodes based on a location of the mobile cleaning robot in the environment based on the sensor data; update the map to include one or more travel indicators between adjacent nodes based on the sensor data; and characterize at least one of the one or more nodes as stasis nodes and characterize at least one of the travel indicators as stasis travel indicators when it is determined that the mobile cleaning robot is in the stasis condition.

In Example 3, the subject matter of Example 2 optionally includes the instructions to further cause the processing circuitry to perform operations to: remove the stasis nodes and the stasis travel indicators following the stasis determination to update the map.

In Example 4, the subject matter of any one or more of Examples 2-3 optionally include the instructions to further cause the processing circuitry to perform operations to: set a value of the one or more stasis travel indicators to zero following the stasis determination to update the map.

In Example 5, the subject matter of any one or more of Examples 2-4 optionally include the instructions to further cause the processing circuitry to perform operations to: generate a queue of the images over a time interval, particular images associated with one or more nodes; characterize at least one of the images as a stasis image associated with at least one of the stasis nodes when it is determined that the mobile cleaning robot is in the stasis condition; and delete the stasis image from the queue.

In Example 6, the subject matter of Example 5 optionally includes the instructions to further cause the processing circuitry to perform operations to: persist remaining nodes, images, and travel indicators following removal of the stasis images from the queue.

In Example 7, the subject matter of any one or more of Examples 1-6 optionally include the instructions to further cause the processing circuitry to perform operations to: compare a first gradient of a first image to a second gradient of a second image to determine whether the mobile cleaning robot is in a stasis condition.

In Example 8, the subject matter of any one or more of Examples 1-7 optionally include the instructions to further cause the processing circuitry to perform operations to: determine a first vertical gradient and a first horizontal gradient of one or more images of a first group of images; determine a second vertical gradient and a second horizontal gradient of one or more images of a second group of images; and determine whether the mobile cleaning robot is in a stasis condition based on the first vertical gradient and the first horizontal gradient of one or more images of the first group of images and based on the second vertical gradient and the second horizontal gradient of one or more images of the second group of images.

In Example 9, the subject matter of any one or more of Examples 1-8 optionally include the instructions to further cause the processing circuitry to perform operations to: determine a first vertical gradient and a first horizontal gradient of one or more images of a first group of images; determine a second vertical gradient and a second horizontal gradient of one or more images of a second group of images; assign a first score value to each image of the first group of images based on the first vertical gradient and the first horizontal gradient of that image; assign a second score value to each image of the second group of images based on the second vertical gradient and the second horizontal gradient of that image; compare the first score value of each of the images of the first group of images to the second score value of each of the images of the second group of images; and determine whether the mobile cleaning robot is in a stasis condition based on the comparison of the first score values to the second score values.

In Example 10, the subject matter of any one or more of Examples 1-9 optionally include the instructions to further cause the processing circuitry to perform operations to: determine corresponding first gradients including first vertical gradients and a first horizontal gradients of one or more images of a first group of images; determine corresponding second gradients including second vertical gradients and a second horizontal gradients of one or more images of a second group of images; compare each of the first gradients to each of the second gradients to determine one or more score values corresponding to the one or more comparisons; and determine whether the mobile cleaning robot is in a stasis condition based on the one or more score values.

In Example 11, the subject matter of any one or more of Examples 1-10 optionally include wherein the sensor data, for determining whether the mobile robot is in a stasis condition, are produced by one or more of an optical sensor of the mobile cleaning robot and a wheel encoder of the mobile cleaning robot.

Example 12 is a method of updating a map of an environment using a mobile cleaning robot, the method comprising: receiving sensor data from the mobile cleaning robot based on interactions between the mobile cleaning robot and the environment; receiving images of the environment from an image capture device of the mobile cleaning robot; determining whether the mobile cleaning robot is in a stasis condition based on the images; and updating a map of the environment based on the stasis determination.

In Example 13, the subject matter of Example 12 optionally includes generating the map of the environment based on sensor data from the mobile cleaning robot based on interactions between the mobile cleaning robot and the environment; updating the map to include one or more nodes based on a location of the mobile cleaning robot in the environment based on the sensor data; updating the map to include one or more travel indicators between adjacent nodes based on the sensor data; and characterizing at least one of the one or more nodes as stasis nodes and characterize at least one of the travel indicators as stasis travel indicators when it is determined that the mobile cleaning robot is in the stasis condition.

In Example 14, the subject matter of Example 13 optionally includes removing the stasis nodes and the stasis travel indicators following the stasis determination to update the map.

In Example 15, the subject matter of any one or more of Examples 13-14 optionally include comparing a first gradient of a first image to a second gradient of a second image to determine whether the mobile cleaning robot is in a stasis condition.

In Example 16, the subject matter of any one or more of Examples 13-15 optionally include determining a first vertical gradient and a first horizontal gradient of one or more images of a first group of images; determining a second vertical gradient and a second horizontal gradient of one or more images of a second group of images; assigning a first score value to each image of the first group of images based on the first vertical gradient and the first horizontal gradient of that image; assigning a second score value to each image of the second group of images based on the second vertical gradient and the second horizontal gradient of that image; comparing the first score value of each of the images of the first group of images to the second score value of each of the images of the second group of images; and determining whether the mobile cleaning robot is in a stasis condition based on the comparison of the first score values to the second score values.

Example 17 is a mobile cleaning robot configured to clean an environment, the mobile cleaning robot comprising: a body; a drivetrain operable to move the body within the environment; a sensor connected to the body and configured to generate a sensor signal based on interactions between the mobile cleaning robot and the environment; an image capture device connected to the body and configured to generate an image stream based on an optical field-of-view of the image capture device; and a controller connected to the body and configured to: determine whether the mobile cleaning robot is in a stasis condition based on the image stream and the sensor signal; and update a map of the environment based on the stasis determination.

In Example 18, the subject matter of Example 17 optionally includes the controller configured to: generate the map of the environment based on the sensor signal; update the map to include one or more nodes based on a location of the mobile cleaning robot in the environment based on the sensor signal; update the map to include one or more travel indicators between adjacent nodes based on the sensor signal; characterize at least one of the one or more nodes as stasis nodes and characterize at least one of the travel indicators as stasis travel indicators when it is determined that the mobile cleaning robot is in the stasis condition; and minimize the stasis nodes and the stasis travel indicators following the stasis determination to update the map.

In Example 19, the subject matter of Example 18 optionally includes the controller configured to: set a value of the one or more stasis travel indicators to zero following the stasis determination to update the map.

In Example 20, the subject matter of any one or more of Examples 17-19 optionally include the controller configured to: compare a first gradient of a first image to a second gradient of a second image to determine whether the mobile cleaning robot is in a stasis condition.

In Example 21, the subject matter of any one or more of Examples 17-20 optionally include the controller configured to: determine a first vertical gradient and a first horizontal gradient of one or more images of a first group of images; determine a second vertical gradient and a second horizontal gradient of one or more images of a second group of images; and determine whether the mobile cleaning robot is in a stasis condition based on the first vertical gradient and the first horizontal gradient of one or more images of the first group of images and based on the second vertical gradient and the second horizontal gradient of one or more images of the second group of images.

In Example 22, the subject matter of any one or more of Examples 17-21 optionally include the controller configured to: determine a first vertical gradient and a first horizontal gradient of one or more images of a first group of images; determine a second vertical gradient and a second horizontal gradient of one or more images of a second group of images; assign a first score value to each image of the first group of images based on the first vertical gradient and the first horizontal gradient of that image; assign a second score value to each image of the second group of images based on the second vertical gradient and the second horizontal gradient of that image; compare the first score value of each of the images of the first group of images to the second score value of each of the images of the second group of images;

and determine whether the mobile cleaning robot is in a stasis condition based on the comparison of the first score values to the second score values.

In Example 23, the subject matter of any one or more of Examples 1-22 optionally include wherein the map of the environment is produced using SLAM or VSLAM.

Example 24 is an apparatus comprising means to implement of any of Examples 1-23.

Example 25 is a system to implement of any of Examples 1-23.

Example 26 is a method to implement of any of Examples 1-23.

In Example 27, the system, apparatus(es), or method of any one or any combination of Examples 1-26 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. At least one non-transitory machine-readable medium, including instructions, which when executed, cause processing circuitry to perform operations to:
   receive sensor data from a mobile cleaning robot based on interaction between the mobile cleaning robot and an environment;
   generate a map of the environment based on the sensor data;
   update the map to include one or more nodes based on a location of the mobile cleaning robot in the environment based on the sensor data;
   update the map to include one or more travel indicators between adjacent nodes based on the sensor data;
   receive images of the environment from an image capture device of the mobile cleaning robot;
   determine whether the mobile cleaning robot is in a stasis condition based on the images and the sensor data; and
   update the map of the environment based on the stasis determination.

2. The at least one non-transitory machine-readable medium of claim 1, the instructions to further cause the processing circuitry to perform operations to:
   characterize at least one of the one or more nodes as stasis nodes and characterize at least one of the travel indicators as stasis travel indicators when it is determined that the mobile cleaning robot is in the stasis condition.

3. The at least one non-transitory machine-readable medium of claim 2, the instructions to further cause the processing circuitry to perform operations to:
   remove the stasis nodes and the stasis travel indicators following the stasis determination to update the map.

4. The at least one non-transitory machine-readable medium of claim 2, the instructions to further cause the processing circuitry to perform operations to:
   set a value of the one or more stasis travel indicators to zero following the stasis determination to update the map.

5. The at least one non-transitory machine-readable medium of claim 2, the instructions to further cause the processing circuitry to perform operations to:
   generate a queue of the images over a time interval, particular images associated with one or more nodes;
   characterize at least one of the images as a stasis image associated with at least one of the stasis nodes when it is determined that the mobile cleaning robot is in the stasis condition; and
   delete the stasis image from the queue.

6. The at least one non-transitory machine-readable medium of claim 5, the instructions to further cause the processing circuitry to perform operations to:

persist remaining nodes, images, and travel indicators following removal of the stasis images from the queue.

7. The at least one non-transitory machine-readable medium of claim 1, the instructions to further cause the processing circuitry to perform operations to:
compare a first gradient of a first image to a second gradient of a second image to determine whether the mobile cleaning robot is in a stasis condition.

8. The at least one non-transitory machine-readable medium of claim 1, the instructions to further cause the processing circuitry to perform operations to:
determine a first vertical gradient and a first horizontal gradient of one or more images of a first group of images;
determine a second vertical gradient and a second horizontal gradient of one or more images of a second group of images; and
determine whether the mobile cleaning robot is in a stasis condition based on the first vertical gradient and the first horizontal gradient of one or more images of the first group of images and based on the second vertical gradient and the second horizontal gradient of one or more images of the second group of images.

9. The at least one non-transitory machine-readable medium of claim 1, the instructions to further cause the processing circuitry to perform operations to:
determine a first vertical gradient and a first horizontal gradient of one or more images of a first group of images;
determine a second vertical gradient and a second horizontal gradient of one or more images of a second group of images;
assign a first score value to each image of the first group of images based on the first vertical gradient and the first horizontal gradient of that image;
assign a second score value to each image of the second group of images based on the second vertical gradient and the second horizontal gradient of that image;
compare the first score value of each of the images of the first group of images to the second score value of each of the images of the second group of images; and
determine whether the mobile cleaning robot is in a stasis condition based on the comparison of the first score values to the second score values.

10. The at least one non-transitory machine-readable medium of claim 1, the instructions to further cause the processing circuitry to perform operations to:
determine corresponding first gradients including first vertical gradients and a first horizontal gradients of one or more images of a first group of images;
determine corresponding second gradients including second vertical gradients and a second horizontal gradients of one or more images of a second group of images;
compare each of the first gradients to each of the second gradients to determine one or more score values corresponding to the one or more comparisons; and
determine whether the mobile cleaning robot is in a stasis condition based on the one or more score values.

11. The at least one non-transitory machine-readable medium of claim 1, wherein the sensor data, for determining whether the mobile robot is in a stasis condition, are produced by one or more of an optical sensor of the mobile cleaning robot and a wheel encoder of the mobile cleaning robot.

12. A method of updating a map of an environment using a mobile cleaning robot, the method comprising:
receiving sensor data from the mobile cleaning robot based on interactions between the mobile cleaning robot and the environment;
generating the map of the environment based on sensor data from the mobile cleaning robot based on interactions between the mobile cleaning robot and the environment;
updating the map to include one or more nodes based on a location of the mobile cleaning robot in the environment based on the sensor data;
updating the map to include one or more travel indicators between adjacent nodes based on the sensor data;
receiving images of the environment from an image capture device of the mobile cleaning robot;
determining whether the mobile cleaning robot is in a stasis condition based on the images; and
updating the map of the environment based on the stasis determination.

13. The method of claim 12, comprising:
characterizing at least one of the one or more nodes as stasis nodes and characterizing at least one of the travel indicators as stasis travel indicators when it is determined that the mobile cleaning robot is in the stasis condition.

14. The method of claim 13, comprising:
removing the stasis nodes and the stasis travel indicators following the stasis determination to update the map.

15. The method of claim 13, comprising:
comparing a first gradient of a first image to a second gradient of a second image to determine whether the mobile cleaning robot is in a stasis condition.

16. The method of claim 13, comprising:
determining a first vertical gradient and a first horizontal gradient of one or more images of a first group of images;
determining a second vertical gradient and a second horizontal gradient of one or more images of a second group of images;
assigning a first score value to each image of the first group of images based on the first vertical gradient and the first horizontal gradient of that image;
assigning a second score value to each image of the second group of images based on the second vertical gradient and the second horizontal gradient of that image;
comparing the first score value of each of the images of the first group of images to the second score value of each of the images of the second group of images; and
determining whether the mobile cleaning robot is in a stasis condition based on the comparison of the first score values to the second score values.

17. A mobile cleaning robot configured to clean an environment, the mobile cleaning robot comprising:
a body;
a drivetrain operable to move the body within the environment;
a sensor connected to the body and configured to generate a sensor signal based on interactions between the mobile cleaning robot and the environment;
an image capture device connected to the body and configured to generate an image stream based on an optical field-of-view of the image capture device; and
a controller connected to the body and configured to:
generate a map of the environment based on the sensor signal;

update the map to include one or more nodes based on a location of the mobile cleaning robot in the environment based on the sensor signal;

update the map to include one or more travel indicators between adjacent nodes based on the sensor signal;

determine whether the mobile cleaning robot is in a stasis condition based on the image stream and the sensor signal; and update the map of the environment based on the stasis determination.

18. The mobile cleaning robot of claim 17, the controller configured to:

characterize at least one of the one or more nodes as stasis nodes and characterize at least one of the travel indicators as stasis travel indicators when it is determined that the mobile cleaning robot is in the stasis condition; and minimize the stasis nodes and the stasis travel indicators following the stasis determination to update the map.

19. The mobile cleaning robot of claim 18, the controller configured to:

set a value of the one or more stasis travel indicators to zero following the stasis determination to update the map.

20. The mobile cleaning robot of claim 17, the controller configured to:

compare a first gradient of a first image to a second gradient of a second image to determine whether the mobile cleaning robot is in a stasis condition.

21. The mobile cleaning robot of claim 17, the controller configured to:

determine a first vertical gradient and a first horizontal gradient of one or more images of a first group of images;

determine a second vertical gradient and a second horizontal gradient of one or more images of a second group of images; and determine whether the mobile cleaning robot is in a stasis condition based on the first vertical gradient and the first horizontal gradient of one or more images of the first group of images and based on the second vertical gradient and the second horizontal gradient of one or more images of the second group of images.

22. The mobile cleaning robot of claim 17, the controller configured to:

determine a first vertical gradient and a first horizontal gradient of one or more images of a first group of images;

determine a second vertical gradient and a second horizontal gradient of one or more images of a second group of images;

assign a first score value to each image of the first group of images based on the first vertical gradient and the first horizontal gradient of that image;

assign a second score value to each image of the second group of images based on the second vertical gradient and the second horizontal gradient of that image;

compare the first score value of each of the images of the first group of images to the second score value of each of the images of the second group of images; and determine whether the mobile cleaning robot is in a stasis condition based on the comparison of the first score values to the second score values.

* * * * *